(12) United States Patent
Piekniewski

(10) Patent No.: US 9,552,546 B1
(45) Date of Patent: Jan. 24, 2017

(54) APPARATUS AND METHODS FOR EFFICACY BALANCING IN A SPIKING NEURON NETWORK

(71) Applicant: Brain Corporation, San Diego, CA (US)

(72) Inventor: Filip Piekniewski, San Diego, CA (US)

(73) Assignee: Brain Corporation, San Diego, CA (US)

( * ) Notice: Subject to any disclaimer, the term of this patent is extended or adjusted under 35 U.S.C. 154(b) by 465 days.

(21) Appl. No.: 13/954,575

(22) Filed: Jul. 30, 2013

(51) Int. Cl.
*G06F 15/18* (2006.01)
*G06N 3/08* (2006.01)

(52) U.S. Cl.
CPC ........................................ *G06N 3/08* (2013.01)

(58) Field of Classification Search
None
See application file for complete search history.

(56) References Cited

U.S. PATENT DOCUMENTS

| | | | |
|---|---|---|---|
| 5,063,603 | A | 11/1991 | Burt |
| 5,138,447 | A | 8/1992 | Shen et al. |
| 5,216,752 | A | 6/1993 | Tam |
| 5,216,757 | A | 6/1993 | Dorkin |
| 5,271,535 | A | 12/1993 | Fridman et al. |
| 5,272,535 | A | 12/1993 | Elabd |
| 5,355,435 | A | 10/1994 | DeYong et al. |
| 5,638,359 | A | 6/1997 | Peltola et al. |
| 5,652,594 | A | 7/1997 | Costas |
| 5,673,367 | A | 9/1997 | Buckley |
| 5,875,108 | A | 2/1999 | Hoffberg et al. |
| 5,997,539 | A | 12/1999 | Errico et al. |

(Continued)

FOREIGN PATENT DOCUMENTS

| | | |
|---|---|---|
| CN | 102226740 A | 10/2011 |
| EP | 1089436 A2 | 4/2001 |

(Continued)

OTHER PUBLICATIONS

Aleksandrov (1968), Stochastic optimization, Engineering Cybernetics, 5, 11-16.

(Continued)

*Primary Examiner* — Paulinho E Smith
(74) *Attorney, Agent, or Firm* — Gazdzinski & Associates, PC

(57) ABSTRACT

Apparatus and methods for plasticity in spiking neuron networks. In various implementations, the efficacy of one or more connections of the network may be adjusted based on a plasticity rule during network operation. The rule may comprise a connection depression portion and/or a potentiation portion. Statistical parameters of the adjusted efficacy of a population of connections may be determined. The statistical parameter(s) may be utilized to adapt the plasticity rule during network operation in order to obtain efficacy characterized by target statistics. Based on the statistical parameter exceeding a target value, the depression magnitude of the plasticity rule may be reduced. Based on a statistical parameter being below the target value, the depression magnitude of the plasticity rule may be increased. The use of adaptive modification of the plasticity rule may improve network convergence while alleviating a need for manual tuning of efficacy during network operation.

18 Claims, 11 Drawing Sheets

(56) References Cited

U.S. PATENT DOCUMENTS

| | | |
|---|---|---|
| 6,009,418 A | 12/1999 | Cooper |
| 6,014,653 A | 1/2000 | Thaler |
| 6,035,389 A | 3/2000 | Grochowski et al. |
| 6,169,981 B1 | 1/2001 | Werbos |
| 6,418,424 B1 | 7/2002 | Hoffberg et al. |
| 6,458,157 B1 | 10/2002 | Suaning |
| 6,509,854 B1 | 1/2003 | Morita et al. |
| 6,532,454 B1 | 3/2003 | Werbos |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,581,046 B1 | 6/2003 | Ahissar |
| 6,601,049 B1 | 7/2003 | Cooper |
| 6,625,317 B1 | 9/2003 | Gaffin et al. |
| 6,917,925 B2 | 7/2005 | Berenji et al. |
| 7,054,850 B2 | 5/2006 | Matsugu |
| 7,565,203 B2 | 7/2009 | Greenberg et al. |
| 7,580,907 B1 | 8/2009 | Rhodes |
| 7,639,886 B1 | 12/2009 | Rastogi |
| 7,653,255 B2 | 1/2010 | Rastogi |
| 7,737,933 B2 | 6/2010 | Yamano et al. |
| 7,765,029 B2 | 7/2010 | Fleischer et al. |
| 7,849,030 B2 | 12/2010 | Ellingsworth |
| 8,000,967 B2 | 8/2011 | Taleb |
| 8,015,130 B2 | 9/2011 | Matsugu et al. |
| 8,103,602 B2 | 1/2012 | Izhikevich |
| 8,154,436 B2 | 4/2012 | Szajnowski |
| 8,160,354 B2 | 4/2012 | Paquier |
| 8,200,593 B2 | 6/2012 | Guillen et al. |
| 8,281,997 B2 | 10/2012 | Moran et al. |
| 8,311,965 B2 | 11/2012 | Breitwisch et al. |
| 8,315,305 B2 | 11/2012 | Petre et al. |
| 8,346,692 B2 | 1/2013 | Rouat et al. |
| 8,390,707 B2 | 3/2013 | Yamashita |
| 8,416,847 B2 | 4/2013 | Roman |
| 8,467,623 B2 | 6/2013 | Izhikevich et al. |
| 8,515,160 B1 | 8/2013 | Khosla et al. |
| 8,583,286 B2 | 11/2013 | Fleischer et al. |
| 8,655,815 B2 | 2/2014 | Palmer et al. |
| 8,712,939 B2 | 4/2014 | Szatmary et al. |
| 8,712,941 B2 | 4/2014 | Izhikevich et al. |
| 8,719,199 B2 | 5/2014 | Izhikevich et al. |
| 8,725,658 B2 | 5/2014 | Izhikevich et al. |
| 8,725,662 B2 | 5/2014 | Izhikevich et al. |
| 8,756,183 B1 | 6/2014 | Daily et al. |
| 8,775,341 B1 | 7/2014 | Commons |
| 8,793,205 B1 | 7/2014 | Fisher et al. |
| 8,817,094 B1 | 8/2014 | Brown et al. |
| 8,942,466 B2 | 1/2015 | Petre et al. |
| 8,943,008 B2 | 1/2015 | Ponulak et al. |
| 8,972,315 B2 | 3/2015 | Szatmary et al. |
| 8,977,582 B2 | 3/2015 | Richert |
| 8,983,216 B2 | 3/2015 | Izhikevich et al. |
| 8,990,133 B1 * | 3/2015 | Ponulak ............. G06N 3/049 706/25 |
| 8,996,177 B2 | 3/2015 | Coenen |
| 2002/0038294 A1 | 3/2002 | Matsugu |
| 2003/0050903 A1 | 3/2003 | Liaw et al. |
| 2003/0216919 A1 | 11/2003 | Roushar |
| 2003/0222987 A1 | 12/2003 | Karazuba |
| 2004/0054964 A1 | 3/2004 | Bozdagi et al. |
| 2004/0064609 A1 | 4/2004 | Sanma et al. |
| 2004/0066363 A1 | 4/2004 | Yamano et al. |
| 2004/0136439 A1 | 7/2004 | Dewberry et al. |
| 2004/0170330 A1 | 9/2004 | Fogg et al. |
| 2004/0193670 A1 | 9/2004 | Langan et al. |
| 2004/0220082 A1 | 11/2004 | Surmeier et al. |
| 2005/0015351 A1 | 1/2005 | Nugent |
| 2005/0036649 A1 | 2/2005 | Yokono et al. |
| 2005/0096539 A1 | 5/2005 | Leibig et al. |
| 2005/0261803 A1 | 11/2005 | Seth et al. |
| 2005/0271289 A1 | 12/2005 | Rastogi |
| 2005/0283450 A1 | 12/2005 | Matsugu et al. |
| 2006/0094001 A1 | 5/2006 | Torre et al. |
| 2006/0129728 A1 | 6/2006 | Hampel |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0024345 A1 | 1/2008 | Watson |
| 2008/0100482 A1 | 5/2008 | Lazar |
| 2008/0162391 A1 | 7/2008 | Izhikevich |
| 2008/0174700 A1 | 7/2008 | Takaba |
| 2008/0199072 A1 | 8/2008 | Kondo et al. |
| 2008/0201282 A1 | 8/2008 | Garcia et al. |
| 2008/0237446 A1 | 10/2008 | Oshikubo et al. |
| 2008/0316362 A1 | 12/2008 | Qiu et al. |
| 2009/0043722 A1 | 2/2009 | Nugent |
| 2009/0043777 A1 | 2/2009 | Wyler et al. |
| 2009/0287624 A1 | 11/2009 | Rouat et al. |
| 2010/0036457 A1 | 2/2010 | Sarpeshkar et al. |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0198765 A1 | 8/2010 | Fiorillo |
| 2010/0225824 A1 | 9/2010 | Lazar et al. |
| 2010/0235310 A1 | 9/2010 | Gage et al. |
| 2010/0299296 A1 | 11/2010 | Modha et al. |
| 2011/0016071 A1 | 1/2011 | Guillen et al. |
| 2011/0119214 A1 | 5/2011 | Breitwisch et al. |
| 2011/0119215 A1 | 5/2011 | Elmegreen et al. |
| 2011/0134242 A1 | 6/2011 | Loubser et al. |
| 2011/0137843 A1 | 6/2011 | Poon et al. |
| 2011/0160741 A1 | 6/2011 | Asano et al. |
| 2011/0184556 A1 | 7/2011 | Seth et al. |
| 2011/0206122 A1 | 8/2011 | Lu et al. |
| 2011/0235698 A1 | 9/2011 | Petre et al. |
| 2012/0011090 A1 | 1/2012 | Tang et al. |
| 2012/0011093 A1 | 1/2012 | Aparin et al. |
| 2012/0036099 A1 | 2/2012 | Venkatraman et al. |
| 2012/0083982 A1 | 4/2012 | Bonefas et al. |
| 2012/0084240 A1 | 4/2012 | Esser et al. |
| 2012/0109863 A1 * | 5/2012 | Esser ............. G06N 3/08 706/25 |
| 2012/0109866 A1 | 5/2012 | Modha |
| 2012/0117012 A1 | 5/2012 | Szatmary et al. |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2012/0330872 A1 | 12/2012 | Esser et al. |
| 2013/0019325 A1 | 1/2013 | Deisseroth et al. |
| 2013/0046716 A1 | 2/2013 | Chan et al. |
| 2013/0073080 A1 | 3/2013 | Ponulak |
| 2013/0073484 A1 | 3/2013 | Izhikevich et al. |
| 2013/0073491 A1 * | 3/2013 | Izhikevich ............. G06N 3/049 706/15 |
| 2013/0073492 A1 | 3/2013 | Izhikevich et al. |
| 2013/0073493 A1 | 3/2013 | Modha |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0103626 A1 | 4/2013 | Hunzinger |
| 2013/0117212 A1 | 5/2013 | Hunzinger et al. |
| 2013/0151450 A1 | 6/2013 | Ponulak |
| 2013/0204814 A1 | 8/2013 | Hunzinger et al. |
| 2013/0204820 A1 | 8/2013 | Hunzinger et al. |
| 2013/0218821 A1 | 8/2013 | Szatmary et al. |
| 2013/0251278 A1 | 9/2013 | Izhikevich et al. |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0304683 A1 | 11/2013 | Lo |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325775 A1 | 12/2013 | Sinyavskiy et al. |
| 2013/0325776 A1 * | 12/2013 | Ponulak ............. G06N 3/08 706/25 |
| 2013/0325777 A1 * | 12/2013 | Petre ............. G06N 3/049 706/26 |

(56) References Cited

U.S. PATENT DOCUMENTS

| | | | |
|---|---|---|---|
| 2014/0012788 A1* | 1/2014 | Piekniewski | G06N 3/02 706/16 |
| 2014/0016858 A1* | 1/2014 | Richert | G06K 9/62 382/156 |
| 2014/0025613 A1 | 1/2014 | Ponulak | |
| 2014/0032458 A1* | 1/2014 | Sinyavskiy | G06N 3/049 706/16 |
| 2014/0032459 A1* | 1/2014 | Sinyavskiy | G05B 13/025 706/16 |
| 2014/0052679 A1 | 2/2014 | Sinyavskiy et al. | |
| 2014/0064609 A1 | 3/2014 | Petre et al. | |
| 2014/0081895 A1 | 3/2014 | Coenen et al. | |
| 2014/0089232 A1 | 3/2014 | Buibas et al. | |
| 2014/0122397 A1 | 5/2014 | Richert et al. | |
| 2014/0122398 A1* | 5/2014 | Richert | G06N 3/049 706/15 |
| 2014/0122399 A1 | 5/2014 | Szatmary et al. | |
| 2014/0122400 A1* | 5/2014 | Szatmary | G06N 3/049 706/15 |
| 2014/0156574 A1 | 6/2014 | Piekniewski et al. | |
| 2014/0193066 A1* | 7/2014 | Richert | G06T 1/20 382/158 |
| 2014/0222739 A1 | 8/2014 | Ponulak | |
| 2014/0244557 A1* | 8/2014 | Piekniewski | G06N 3/02 706/16 |
| 2014/0310220 A1 | 10/2014 | Chang et al. | |
| 2014/0379623 A1* | 12/2014 | Piekniewski | G06N 3/08 706/15 |
| 2015/0005937 A1* | 1/2015 | Ponulak | G06N 3/049 700/253 |
| 2015/0120626 A1* | 4/2015 | Gupta | G06N 3/049 706/20 |

FOREIGN PATENT DOCUMENTS

| | | |
|---|---|---|
| JP | H0487423 A | 3/1992 |
| RU | 2108612 C1 | 4/1998 |
| RU | 2406105 C2 | 12/2010 |
| RU | 2424561 C2 | 7/2011 |
| WO | WO-2008083335 A2 | 7/2008 |
| WO | WO-2008132066 A1 | 11/2008 |

OTHER PUBLICATIONS

Amari (1998), Why natural gradient?, Acoustics. Speech and Signal Processing, (pp. 1213-1216). Seattle, WA, USA.

Baras, D. et al. "Reinforcement learning, spike-time-dependent plasticity, and the BCM rule." Neural Computation vol. 19 No. 8 (2007): pp. 2245-2279.

Bartlett et al., (2000) "A Biologically Plausible and Locally Optimal Learning Algorithm for Spiking Neurons" Retrieved from http://arp.anu.edu.au/ftp/papers/jon/brains,pdf.

Baxter et al., (2000), Direct gradient-based reinforcement learning, in Proceedings of the International Symposium on Circuits and Systems, (pp. III-271-III-274).

Bennett, M.R., (1999), The early history of the synapse: from Plato to Sherrington. Brain Res. Boll., 50(2): 95-118.

Berkes and Wiskott. Slow feature analysis yields a rich repertoire of complex cell properties. Journal of Vision (2005) vol. 5 (6).

Bertsekas, Dimitri P., and Dimitri P. Bertsekas. Dynamic programming and optimal control. vol. 1. No. 2. Belmont, MA: Athena Scientific, 1995.

Bertsekas, Dimitri P., "Approximate dynamic programming." (2011).

Bohte et al., (2000), Spike Prop: backpropagation for networks of spiking neurons, in Proceedings of ESANN'2000, (pp. 419-424).

Bohte et al., "A Computational Theory of Spike-Timing Dependent Plasticity: Achieving Robust Neural Responses via Conditional Entropy Minimization" 2004.

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages ,cwi ,n11- sbolltedmblicabond)hdthesislxif>.

Booij(2005). A Gradient Descent Rule for Spiking Neurons Emitting Multiple Spikes. Information Processing Letters n. 6. v.95 , 552-558.

Breiman et al., "Random Forests" 33pgs, Jan. 2001.

Brette et al., Brian: a simple and flexible simulator for spiking neural networks, The Neuromorphic Engineer, Jul. 1, 2009, pp. 1-4, doi: 10.2417/1200906.1659.

Capel, "Random Forests and ferns" LPAC, Jan. 1, 2012, 40 pgs.

Cessac et al. 'Overview of facts and issues about neural coding by spikes.' Journal of Physiology, Paris 104.1 (2010): 5.

Chistiakova, Marina, and Maxim Volgushev. "Heterosynaptic plasticity in the neocortex." Experimental brain research 199.3-4 (2009): 377-390.

Competitive behaviors of a spiking neural network with spike timing dependent plasticity, Chengmei Ruan ; Qingxing Wu ; Lijuan Fan ; Zhiqiang Zhuo ; Xiaowei Wang, Biomedical Engineering and Informatics (BMEI), 2012 5th International Conference on DOI: 10.1109/BMEI.2012.6513088 Publication Year: 2012 , pp. 1015-1019.

Cuntz et al., 'One Rule to Grow Them All: A General Theory of Neuronal Branching and Its Paractical Application' PLOS Computational Biology, 6 (8), Published Aug. 5, 2010.

Day Y., et al., "Spike Timing-dependent Plasticity of Neural Circuits," Neuron, 2004, vol. 44 (1), pp. 23-30.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of interspike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Field, G.; Chichilnisky, E, Information Processing in the Primate Retina: Circuitry and Coding. Annual Review of Neuroscience, 2007, 30(1), 1-30.

Fiete, et al, Spike-Time-Dependent Plasticity and Heterosynaptic Competition Organize Networks to Produce Long Scale-Free Sequences of Neural Activity. Neuron 65, Feb. 25, 2010, pp. 563-576.

Fletcher (1987), Practical methods of optimization, New York, NY: Wiley-Interscience.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Florian (2005), A reinforcement learning algorithm for spiking neural networks SYNASC '05 Proceedings of the Seventh International Symposium on Symbolic and Numeric Algorithms for Scientific Computing.

Florian03, Biologically Inspired Neural Networks for the Control of Embodied Agents, Technical Report Coneural-03-03 Version 1.0 [online], Nov. 30, 2003 [retrieved on Nov. 24, 2014]. Retrieved from the Internet: <URL:http://citeseerx.ist.psu.edu/viewdoc/download?doi=10.1.1.216.4931-&rep1&type=pdf>.

Foldiak, P. Learning invariance from transformation sequences. Neural Computation, 1991, 3(2), 194-200.

Fremaux. N et al., "Functional Requirements for Reward-Modulated Spike-Timing-Dependent Plasticity", The Journal of Neuroscience, Oct. 6, 2010, 30 (40):13326-13337.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.

(56) References Cited

OTHER PUBLICATIONS

Fu (2005) Stochastic Gradient Estimation, Technical Research Report.

Fu (2008), What You Should Know About Simulation and Derivatives Naval Research Logistics, vol. 55, No. 8 , 723-736.

Fyfe et al., (2007), Reinforcement Learning Reward Functions for Unsupervised Learning, ISNN '07 Proceedings of the 4th international symposium on Neural Networks: Advances in Neural Networks.

Gerstner (2002), Spiking neuron models: single neurons, populations, plasticity, Cambridge, U.K.: Cambridge University Press.

Gerstner et al. (1996) A neuronal learning rule for sub-millisecond temporal coding. Nature vol. 383 (6595) pp. 76-78.

Gewaltig et al.. 'NEST (Neural Simulation Tool)', Scholarpedia, 2007. pp. 1-15. 2(4): 1430, doi: 1 0.4249/scholarpedia.1430.

Glackin, C. et al., Feature Extraction from Spectra-temporal Signals using Dynamic Synapases, recurrency, and lateral inhibition, Neural Networks (IJCNN), The 2010 International Joint Conference on DOI: 10.1109/IJCNN.2010.5596818 Publication Year: 2010, pp. 1-6.

Glackin C., et al., "Feature Extraction from Spectro-temporal Signals Using Dynamic Synapses, Recurrency, and Lateral Inhibition," The 2010 International Joint Conference on Neural Networks, 2010, pp. 1-6.

Gleeson et al., NeuroML: A Language for Describing Data Driven Models of Neurons and Networkd with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL:http:// www.google.coinlurl ?sa—t&rct—j&q—Giuck+ 4)/022STIMULUS+GENERALIZATION+AND+REPRESENTATIO N+1N +ADAPTIVE+ NETWORK+MODELS±0F+CATEGORY+LEARN I NG%22+ 1991.

Glynn (1995), Likihood ration gradient estimation for regenerative stochastic recursion Advances in Applied Probability 27.4. 1019-1053.

Gollisch et al., 'Rapid neural coding in the retina with relative spike latencies.' Science 319.5866 (2008): 1108-1111.

Goodman et al., Brian: a simulator for spiking neural netowks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual http://www.neuriphys.biomedicale.univparis5. fr/graham/surf-hippo-files/Surf-Hippo%20Reference%20Manual.pdf, Mar. 2002. pp. 1-128.

Hanselmann T., et al., "Continuous-time Adaptive Critics," IEEE Transactions on Neural Newtorks, 2007, vol. 18 (3), pp. 631-647.

Ho, "Random Decision Forest" Int'l Conf. Document Analysis and Recognition, 1995, 5 pgs.

Hopfield JJ (1995) Pattern recognition computation using action potential timing for stimulus representation.Nature 376: 33-36.

In search of the artificial retina [online]. Vision Systems Design. Apr. 1, 2007.

International Search Report and Written Opinion for Application No. PCT/US2012/039696, mailed on Sep. 6, 2012, 9 pages.

International Search Report and Written Opinion for Application No. PCT/US2012/040560, mailed on Sep. 21, 2012, 8 pages.

International Search Report and Written Opinion for Application No. PCT/US2012/040567, mailed on Sep. 21, 2012, 12 pages.

International Search Report and Written Opinion for Application No. PCT/US2012/040576, mailed on Sep. 21, 2012, 12 pages.

International Search Report and Written Opinion for Application No. PCT/US2013/039985, mailed on Nov. 26, 2013, 11 pages.

International Search Report and Written Opinion for Application No. PCT/US2013/044124, mailed on 12 <g class="gr_ gr_ 4 gr-alert gr_ spell ContextualSpelling ins-del multiReplace" id="4" data-gr-id="4" /Sep. 2013, 6 Pages.

International Search Report for Application No. PCT/US2013/026738, mailed on Jul. 21, 2014,4 pages.

International Search Report for Application No. PCT/US2014/040407, mailed on Oct. 17, 2014, 2 pages.

It, Laurent, and Christof Koch. "Computational modelling of visual attention."Nature reviews neuroscience 2.3 (2001): 194-203.

Izhikevich E.M. (2004) Which Model to Use for Cortical Spiking Neurons? IEEE Transactions on Neural Networks, 15:1063-1070.

Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from Internet:<http://ncs.ethz.ch/projects/evospike/publications/evolving-spiking-ne-ural-networks-for-spatio-and-spectro-temporal-pattern-recognition-plenary--talk-ieee-is>.

Kazantsev, et al., "Active Spike Transmission in the Neuron Model With a Winding Threshold Maniford", Jan. 3, 2012,205-211,7 pages.

Khotanzad. 'Classification of invariant image representations using a neural network' IEEE Transactions on Acoustics, Speech, and Signal Processing, vol. 38, No. 6, Jun. 1990, pp. 1028-1038 [online], [retrieved on Dec. 10, 2013]. Retrieved from the Internet &IT;URL: http://www-ee.uta.edu/eewed/IP/Courses/SPR/Reference/ Khotanzad.pdf.

Knoblauch, et at Memory Capacities for Synaptic and Structural Plasticity, Neural Computation 2009, pp, 1-45.

Laurent, 'The Neural Network Query Language (NNQL) Reference' [retrieved on Nov. 12, 2013]. Retrieved from the Internet: <URL'https://code.google.com/p/ nnql/issues/detail?id=1>.

Lendek Babushka Z.S., and De Schutter B. (2006) State Estimation under Uncertainty- . A Survey: 'Technical report 06-004 Deth Center for systems and Control Delft University of Technology.

Werbos P.J., Neurocontrol and Fuzzy Logic: Connections and Designs, International Journal of Approximate Reasoning, 1992, vol. 6 (2), pp. 185-219.

A Neural Network for Ego-motion Estimation from Optical Flow, by Branka, Published 1995.

Blais B.S., et al., "BCM Theory," Scholarpedia, 2008, vol. 3 (3), 13 pages.

Brette, et al., "Simulation ofNetworks of Spiking Neurons: A Review of Tools and Strategies", Received Jan. 29, 2006, Revised Apr. 2, 2007, accepted Apr. 12, 2007, Springer Science, 50 pages.

Christo Panchev, "Temporal Processing in a Spiking Model of the Visual System", S. Kollias et al. (Eds.): ICANN 2006, Part 1, LNCS 4131, Springer-Verlag, Berlin, 2006, pp. 750-759.

Dan Y., et al., "Spike Timing-dependent Plasticity of Neural Circuits," Neuron, 2004, vol. 44 (1), pp. 23-30.

de Queiroz, M. et al. "Reinforcement learning of a simple control task using the spike response model." Neurocomputing vol. 70 No. 1 (2006): pp. 14-20.

El-Laithy (2011), A reinforcement learning framework for spiking networks with dynamic synapses, Comput Intell Neurosci.

Florian03, Biologically Inspired Neural Networks for the Control of Embodied Agents, Technical Report Coneural-03-03 Version 1.0 [online], Nov. 30, 2003 [retrieved on Nov. 24, 2014]. Retrieved from the Internet:<URL:http://citeserx.ist.psu.edu/viewdoc/download?doi=10.1.1.216.4931-&rep1&type=pdf>.

Fremaux. N et al., "Functional Requirements for Reward-Modulated Spike-Timing-Dependent Plasticity", The Journal of Neuroscience, Oct. 6, 2010, 30 (40)1 3326-13337.

Glackin, C. et al., Feature Extraction from Spectra-temporal Signals using Dynamic Synapses, recurrency, and lateral inhibition, Neural Networks (IJCNN), The 2010 International Joint Conference on DOI: 10.1109/IJCNN.2010.5596818 Publication Year: 2010, pp. 1-6.

Govindhasamy, James J., Sean F. McLoone, and George W. Irwin. "Sequential learning for adaptive critic design: An industrial control application." Machine Learning for Signal Processing, 2005 IEEE Workshop on. IEEE, 2005.

(56) References Cited

OTHER PUBLICATIONS

Hagras, Hani, et al., "Evolving Spiking Neural Network Controllers for Autonomous Robots", IEEE 2004.

Hanselmann T., et al., "Continuous-time Adaptive Critics," IEEE Transactions on Neural Networks, 2007, vol. 18 (3), pp. 631-647.

Huang, Fall Detection Using Modular Neural Networks with Backprojected Optical Flow, Published 2007.

International Search Report for International Application PCT/US2013/060352 dated Jan. 16, 2014.

International Search Report for PCT/US2013/052136 dated Nov. 21, 2013.

It, Laurent, and Christof Koch. "Computational modelling of visual attention." Nature reviews neuroscience 2.3 (2001): 194-203.

Izhikevic, F. (2007), Solving the Distal Reward Problem through Linkage of ST DP and Dopamine Signaling, Cerebral Cortex, vol. 17, 2443-2452.

Izhikevich E. M, and Hoppensteadt F.C. (2009) Polychronous Wavefront Computations. International Journal of Bifurcation and Chaos, 19:1733-1739.

Izhikevich E.M. (2006) Polychronization: Computation With Spikes. Neural Computation, 18:245-282.

Izhikevich E.M., "Neural Excitability, Spiking and Bursting", Neurosciences Institute, Received Jun. 9, 1999, Revised Oct. 25, 1999, 1171-1266, 96 pages.

Izhikevich et al., 'Relating STDP to BCM', Neural Computation (2003) 15, 1511-1523.

Izhikevich, E,M. (2007) Dynamical Systems in Neuroscience: The Geometry of Excitability and Bursting, The MIT Press, 2007.

Izhikevich, Eugene M., Dynamical systems in neuroscience: chapters 1 and 2, MIT press, 2007.

Izhikevich, 'Simple Model of Spiking Neurons', IEEE Transactions on Neural Networks, vol. 14, No. 6, Nov. 2003, pp. 1569-1572.

Janowitz, M.K.; Van Rossum, M.C.W. Excitability changes that complement Hebbian learning. Network, Computation in Neural Systems, 2006, 17 (1), 31-41.

Kaelbling, Leslie Pack, Michael L. Littman, and Andrew W. Moore. "Reinforcement learning: A survey." arXiv preprint cs/9605103 (1996).

Kalal et al. Online learning of robust object detectors during unstable tracking published on 3rd On-line Learning for Computer Vision Workshop 2009, Kyoto, Japan, IEEE CS.

Karbowski et al., 'Multispikes and Synchronization in a Large Neural Network with Temporal Delays', Neural Computation 12. 1573-1606 (2000).

Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from Internet:<http://ncs.ethz.ch/projects/evospike/publications/evolving-spiking-ne-ural-networks-for-spatio-and-spectro-temporal-pattern-recognition-plenary—talk-ieee-is>.

Kazantsev, et al., "Active Spike Transmission in the Neuron Model With a Winding Threshold Maniford", 01/03112,205-211,7 pages.

Kenji Doya (2000), Reinforcement Learning in Continuous Time and Space, Neural Computation, 12:1. 219-245.

Khotanzad. 'Classification of invariant image representations using a neural network' IEEE Transactions on Acoustics, Speech, and Signal Processing, vol. 38, No. 6, Jun. 1990, pp. 1028-1038 [online], [retrieved on Dec. 10, 2013]. Retrieved from the Internet <URL:http://www-ee.uta.edu/eeweb/IP/Courses/SPR/Reference/ Khotanzad.pdf.

Kiefer (1952), Stochastic Estimation of tbe Maximum of a Regression Function, Annals of Mathematica[ Statistics 23, #3, 462-466.

Klampfl (2009), Spiking neurons can learn to solve information bottleneck problems and extract independent components, Neural Computation, 21(4), pp. 911-959.

Kleijnen et al., Optimization and sensitivity analysis of computer simulation models by the score function method Invited Review European Journal of Operational Research, Mar. 1995.

Kling-Petersen, PhD, "Sun and HPC: From Systems to PetaScale" Sun Microsystems, no date, 31 pages.

Klute et al., "Artificial Muscles: Actuators for Biorobotic Systems," The International Journal Robotics Research, 2002, vol. 21, pp. 295-309.

Knoblauch A., et al., "Memory Capacities for Synaptic and Structural Plasticity," Neural Computation, 2010, vol. 22 (2), pp. 289-341.

Knoblauch, et at Memory Capacities for Synaptic and Structural Plasticity, Neural Computation 2009, pp. 1-45.

Larochelle et al., (2009), Exploring Strategies for Training Deep Neural Networks, J. of Machine Learning Research, v. 10, pp. 1-40.

Lars Buesing, Wolfgang Maass, "Simplified Rules and Theoretical Analysis for Information Bottleneck Optimization and PCA with Spiking Neurons", NIPS Proceedings, 2007, "http:I/papers.nips.cc/paper/3168-simplified-rules-and-theoretical-analysis-forinformation-bottleneck-optimization-and-pea-with-spiking-neurons", 2007, pp. 1-8.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.

Laurent, 'The Neural Network Query Language (NNQL) Reference' [retrieved on Nov. 12, 2013]. Retrieved from the Internet: <URL'https://code.google.com/p/ nnql/issues/detail?id=1>.

Lazar et a]. 'Multichannel time encoding with integrate-and-fire neurons.' Neurocomputing 65 (2005): 401-407.

Lazar et al. 'A video time encoding machine', in Proceedings of the 15th IEEE International Conference on Image Processing (ICIP '08 2008, pp. 717-720.

Lazar et al. 'Consistent recovery of sensory stimuli encoded with MIMO neural circuits.' Computational intelligence and neuroscience (2010): 2.

Lazar., et al., "Consistent recovery of sensory stimuli encoded with MIMO neural circuits," Computational intelligence and neuroscience, 2009.

Legenstein, R., et al. (2008), .A learning theory for reward-modulated spike timingsdependent plasticity with application to biofeedback. PLoS Computational Biology. 4(10): 1 -27.

Lendek Babushka Z.S., and De Schutter B. (2006) State Estimation under Uncertainty—. A Survey: 'Technical report 06-004 Deth Center for systems and Control Delft University of Technology.

Leydesdorff L., et al., "Classification and Powerlaws: The Logarithmic Transformation, Journal of the American Society for Information Science and Technology (forthcoming)", 2006.

Li, Zhaoping. "A saliency map in primary visual cortex." Trends in cognitive sciences 6.1 (2002): 9-16.

Lin, Long-Ji. "Self-improving reactive agents based on reinforcement learning, planning and teaching." Machine learning 8.3-4 (1992): 293-321.

Lyle N. Long and Ankur Gupta, "Biologically-Inspired Spiking Neural Networks with Hebbian Learning for Vision Processing", AIAA Paper No. 2008-0885, presented at AIAA 46th Aerospace Sciences Meeting, Reno NV Jan. 2008, pp. 1-17.

Markam, Henry, et al. "Regulation of synapic Efficacy by coincidence of postsynaptic APs and EPSPs." Science 275.5297 (1997): 213-215.

Martinez-Perez, et al., "Automatic Activity Estimation Based on Object Behavior Signature", 2010, 10 pages.

Masakazu et al, "Convolutional Spiking Neural Network Model for Robust Face Detection", Proceedings of the 9th International Conference on neural Information Processing (ICONIP'02), vol. 2, 2002, pp. 660-664.

Masquelier and Thorpe, Learning to recognize objects using waves of spikes and Spike Timing-Dependent Plasticity. Neural Networks (IJCNN), The 2010 International Joint Conference on DOI—10.1109/1JCNN.2010.5596934 (2010) pp. 1-8.

Masquelier, Timothee, 'Relative spike time coding and STOP-based orientation selectivity in the early visual system in natural continuous and saccadic vision: a computational model.' Journal of computational neuroscience 32.3 (2012): 425-441.

Matsugu, et al., "Convolutional Spiking Neural Network for Robust Object Detection with Population Code using Structured Pulse Packets", 2004, 39-55, 17 pages.

(56) References Cited

OTHER PUBLICATIONS

Medin I.C., et al., Modeling Cerebellar Granular layer Excitability and Combinatorial Computation with Spikes, Bio-Inspired Computing: Theories and Applications (BIC-TA), 2010 IEEE Fifth International Conference on DOI: 10.1 109/BICTA.201 0.5645274, Publication Year: 2010, pp. 1495-1503.

Medini C., et al., "Modeling Cerebellar Granular Layer Excitability and Combinatorial Computation with Spikes," IEEE Fifth International Conference on Bio-Inspired Computing: Theories and Applications, 2010, pp. 1495-1503.

Meinhardt, Hans, and Alfred Gierer. "Pattern formation by local self-activation and lateral inhibition." Bioessays 22.8 (2000): 753-760.

Meister, M, Multineuronal codes in retinal signaling. Proceedings of the National Academy of sciences. 1996, 93, 609-614.

Meister, M.; Berry, M.J. The neural code of the retina, Neuron, 1999, 22, 435-450.

N Venkateswaran, B Harish, R Chidambareswaran, "A Novel Perspective into the Neuronal Encoding Along the Retinal Pathway Employing Time-Frequency Transformation: Part II—For Color", Brain Inspired Cognitive systems, 2004, pp. BIS4-31-BIS4-37.

Natalia C., et al., "Spike Timing-dependent Plasticity: a Hebbian Learning Rule," Annual Review of Neuroscience, 2008, vol. 31, pp. 25-46.

Nichols, A Reconfigurable Computing Architecture for Implementing Artificial Neural Networks on FPGA, Master's Thesis, The University of Guelph, 2003, pp. 1-235.

Nikolic, K., San Segundo Bello D.. Delbruck T, Liu, S.. and Roska, B. High-sensitivity silicon retina for robotics and prosthetics 2011.

Niv, et al., Evolution of Reinforcement Learning in Uncertain Environments: A Simple Explanation for Complex Foraging Behaviors, International Society for Adaptive Behavior, 2002, vol. 10(1), pp. 5-24.

Oja, Erkki (2008), Scholarpedia "Oja learning rule.".

Ojala et al., "Performance Evaluation of Texture Measures with Classification Based on Kullback Discrimination of Distributions" 1994 IEEE, pp. 582-585.

Oster M., Lichtsteiner P,, Delbruck T, Liu S, A Spike-Based Saccadic Recognition System, ISCAS 2007. IEEE International Symposium on Circuits and Systems, 2009, pp. 3083-3086.

Ostojic, Srdjan, Nicolas Brunel, From Spiking Neuron Models to Linear-Nonlinear Models, Jan. 2011, vol. 7 (1), e1001056.

Ozuysal et al., "Fast Keypoint Recognition in len Lines of Code" CVPR 2007.

Ozuysal et al., "Fast Keypoint Recognition Using Random Ferns" IEEE Transactions on Pattern Analysis and Machine Intelligence, vol. 32, No. 3, Mar. 2010. pp. 448-461.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].

Paugam-Moisy, et al., "Computing with Spiking Neuron Networks" Handbook of Natural Computing, 40 pages Springer, Heidelberg (2009).

Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu! viewdoc/download?doi=0.1.1.5.4346&rep—repl&type-pdf.

PCT International Search Report and Written Opinion for PCT/ US2014/48512 dated Jan. 23, 2015, pp. 1-14.

Pfister (2003), Optimal Hebbian Learning: A Probabilistic Point of View. In ICANN Proceedings. Springer, pp. 92-98.

Pfister (2006), Optimal Spike-Timing Dependent Plasticity for Precise Action Potential Firing in Supervised Learning, Neural computation ISSN 0899-7667, 18 (6).

Phenomenological models of synaptic plasticity based on spike timing Abigail Morrison Markus Diesmann Wulfram Gerstner Received: Jan. 16, 2008/ Accepted: Apr. 9, 2008 © The Author(s) 2008.

Ponulak, "Analysis of the Resume learning Process for Spiking Neural Networks," International Journal of Applied Mathematics & Computer Science, 2008, vol. 18 (2), pp. 117-127.

Ponulak, F., (2005), ReSuMe—New supervised learning method for Spiking Neural Networks Technical Report, Institute of Control and Information Engineering, Poznan University of Technology.

Ponulak, F., Kasinski, A.: Supervised learning in spiking neural networks with ReSuMe: sequence learning, classification, and spike shifting. Neural Comp .22(2): 467-510.

Prokhorov, Danil V., and Lee A. Feldkamp. "Primitive adaptive critics." Neural Netowrks, 1997., International Conference on. vol. 4. IEEE, 1997.

QingXiang Wu et al, Edge Detection Based on Spiking Neural Network Model, ICIC 2007, LNAI 4682, pp. 26-34,2007, Springer-Verlag, Berlin Heidelberg.

Rafael Serrano-Gotarredona, Teresa Serrano-Gotarredona, Antonio Acosta-Jimenez, and Bernabe Linares-Barranco, "A Neuromorphic Cortical-Layer Microchip for Spike-Based Event Processing Vision Systems", Circuits and Systems 1: Regular Papers, IEEE Transactions on (vol. 53, Issue: 12), Dec. 12, 2006, pp. 2548-2566.

Ramachandran, et al., "The Perception of Phantom Limbs", The D.O. Hebb Lecture, Center for Brain and Cognition, University of California, 1998, 121, 1603-1630,28 pages.

Rebecca L. VislayMeltzer, Adam R. kampff, Florian Engert, "Spatiotemporal Specificity of neurol activity directs the modification of receptive fields in the developing retinotectal system", neuron 50, Apr. 6, 2006, pp. 101-114.

Reiman et al. (1989). Sensitivity analysis for simulations via likelihood ratios. Oper Res 37, 830-844.

Reinforcement Learning in Intelligent Control: A Biologically-Inspired Approach to the Relearning Problem. Brendan D'Cruz May 1998.

Reinforcement Learning Through Modulation of Spike-Timing-Dependent Synaptic Plasticity, Razvan V. Florian Neural Computation 19, 1468-1502 (2007) Massachusetts Institute of Technology.

Rekeczky, et al., "Cellular Multiadaptive Analogic Architecture: A Computational Framework for UAV Application." May 2004.

Revow M., Williams C,, and Hinton, G.E., 1996. Using Generative Models for Handwritten Digit Recognition, IEEE Trans. on Pattern Analysis and Machine Intelligence, 18, No, 6, Jun. 1996.

Robbins (1951), A Stochastic Approximation Method, Annals of Mathematical Statistics 22, #3, 400-407.

Rosenstein et al., (2002), Supervised learning combined with an actor-critic architecture, Technical Report 02-41, Department of Computer Science, University of Massachusetts, Amherst.

Rumelhart (1986), Learning internal representations by error propagation, Parallel distributed processing, vol. 1 (pp. 318-362), Cambridge, MA: MIT Press.

Rumelhart et a[., (1986), Learning representations by back-propagating errors, Nature 323 (6088) , pp. 533-536.

Sanchez, Efficient Simulation Scheme for Spiking Neural Networks. Doctoral Thesis. (Juiversita di Granada Mar. 28, 2008, pp. 1-104.

Sato et al., 'Pulse interval and width modulation for video transmission.' Cable Television, IEEE Transactions on 4 (1978): 165-173.

Schemmel, J., Grub!, A., Meier, K., Mueller, E.: Implementing synaptic plasticity in a VLSI spiking neural network model. In: Proceedings of the 2006International Joint Conference on Neural Networks (IJCNN'06), IEEE Press (2006) Jul. 16-21, 2006, pp. 1-6 [online], [retrieved on Aug. 24, 2012]. Retrieved from the Internet <URL: http://www.kip.uniheidelberg.deNeroeffentlichungen/ download.cgi/4620/ps/1774.pdf> Introduction.

Schnitzer, M.J.; Meister, M.; Multineuronal Firing Patterns in the Signal from Eye to Brain. Neuron, 2003, 37, 499- 511.

Schrauwen et al., "Improving SpikeProp: Enhancements to an Error-Backpropagation Rule for Spiking Neural Networks", ProsRISC Workshop, 2004, pp. 301-305.

(56) References Cited

OTHER PUBLICATIONS

Schreiber S., et al., "A New Correlation-based Measure of Spike Timing Reliability," Neurocomputing, 2003, vol. 52-54, pp. 925-931.
Serrano-Gotarredona, et al, "On Real-Time: AER 2-D Convolutions Hardware for Neuromorphic Spike-based Cortical Processing", Jul. 2008.
Seung. H. "Learning in spiking neural networks by reinforcement of stochastic synaptic transmission." Neuron vol. 40 No. 6 (2003): pp. 1063-1073.
Simulink.RTM. model [online], [Retrieved on Dec. 10, 2013] Retrieved from <URL: http://www.mathworks.com/ products/ simulink/index.html>.
Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Articla with English Abstract).
Sinyavskiy O.YU., "Obuchenic s Podkrepleniem Spaikovoy Neironiniy Seti v Zadache Upravleniya Agentom v Diskretnoy Virtualnoy Srede." Nelineinaya Dinamike, vol. (24), 2011, pp. 859-875.
Sinyavskiy, et al. (2010), Generalized Stochatic Spiking Neuron Model and Extended Spike Response Model in Spatial-Temporal Impulse Pattern Detection Task Optical Memory and Neural Networks (Information Optics) 2010 vol. 19 No. 4 pp. 300-309.
Sjostrom et al., 'Spike Timing Dependent Plasticity'Scholarpedia, 5(2):1362 (2010), pp. 1-18.
Steele P.M., et al., "Inhibitory Control of LTP and LTD: Stability of Synapse Strength," Journal of Neurphysiology, 1999, vol. 81 (4), pp. 1559-1566.
Stein. R.B..(1967).Some models of neural variability. Biophys. J.. 7:.37-68.
Stringer, et al., 3"Invariant Object Recognition in the Visual System with Novel Views of 3D Objects", 2002, 2585-2596, 12 pages.
Supervised learning in Spiking Neural .Netowkrs with ReSuMe Method. Filip Ponulak, Doctoral Dissertation Poznan, Poland 2006.
Sutton R.S. (1988). Learning to predict by the methods of temporal differences. Machine Learning 3(1), 9-44.
SWAT: A Spiking Neural Network Training Algorithm for Classification Problems, Wade, J.J. ; McDaid, L.J.; Santos, J.A. ; Sayers, H.M., Neural Networks, IEEE Transactions on vol. 21 , Issue: 11 DOI: 10.1109/TNN.2010.2074212 Publication Year: 2010 , pp. 1817-1830.
Swiercz, Waldemar, et al. "A new synaptic plasiticity rule for networks of spiking neurons." Neural Networks, IEEE Transactions on 17.1 (2006): 94-105.
Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL:http://www. ploscompbioLorg/article/infor%3Adoi% 2F10. 1371%2Fjournal,pcbi.1000879<url></url:>.
Tegner J., et al., "An Adaptive Spike-timing-dependent Plasticity Rule" Elsevier Science B.V., 2002.
Thomas S. and Riesenhuber, M, 2004, Realistic Modeling of Simple and Complex Cell Tuning in the HMAX Model, and Implications for Invariant Object Recognition in Cortezx, AI Memo 2004-017 Jul. 2004.
Thorpe S.; Ultra-Rapid Scene Categorization with a Wave of Spikes. In H,H. Bulthoff et al. (eds.), Biologically Motivated Computer Vision. Lecture Notes in Computer Science, 2002, 2525, pp. 1-15, Springer-Verlag, Berlin.
Thorpe, S.J., Delorme, A. & VanRullen, R, (2001). Spike-based strategies for rapid processing. Neural Networks 14, pp. 715-725.
Thorpe, S.J., Guyonneau, R., Guilbaud, N,, Allegraud, J-M, & VanRullen, R. (2004), SpikeNet: real-time visual processing with one spike per neuron. Neurocomputing, 58-60, pp. 857-864.
Timothee Masquelier, "Learning Mechanisms to Account for the Speed, Selectivity and Invariance of Responses in the Visual Cortex", phD thesis published by Universite Toulouse III-Paul Sabatier, U.F.R. Sciences de la Vie et de la Terre, Feb. 15, 2008, pp. 1-192.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weigbt Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 5239-5244).
Van Rullen R,; Thorpe, S, Rate Coding versus temporal order coding: What the Retinal ganglion cells tell the visual cortex. Neural computation, 2001, 13, 1255-1283.
VanRullen, R, & Koch, C. (2003), Is perception discrete or continuous? Trends in Cognitive Sciences 7(5), pp. 207-213.
VanRullen, R., Guyonneau, R. & Thorpe, S.J. (2005). Spike times make sense. Trends in Neurosciences 28(1).
Vasilaki et al., "Spike-Based Reinforcement Learning in Continuous State and Action Space: When Policy Gradient Methods Fail" PLoS, vol. 5, Issue 12, Dec. 2009.
Vasilaki, et al., "Learning flexible sensori-motor mappings in a complex network" Biol Cybern(2009) 100:147-158.
Visual Navigation with a Neural Network, by Hatsopoulos, Published 1991.
Voutsas K., et al., A Biologically Inspired Spiking Neural Network for Sound Source Lateralization Neural Networks, IEEE Transactions on vol. 18, Issue: 6 DOI: 10.11.09/TNN.2007.899623, Publication Year: 2007, pp. 1785-1799.
Wallis, G.; Rolls, E. T. A model of invariant object recognition in the visual system, Progress in Neurobiology. 1997, 51, 167-194.
Wang 'The time dimension for scence analysis.' Neural Networks, IEEE Transactions on 16.6 (2005): 1401-1426.
Wang, R. et al., A programmable axonal propagation delay circuit for time-delay spiking neural networks. Circuits and System (ISCAS), 2011 IEEE International Symposium on. May 15-18, 2011, pp. 869-872 [retrieved on Nov. 13, 2013]. [retrieved from ieeeplore.ieee.org].
Weaver (2001), The Optimal Reward Baseline for Gradient-Based Reinforcement Learning, UA1 01 Proceedings of the 17th Conference in Uncertainty in Artifricial Intelligence (pp. 538-545). Morgan Kaufman Publishers.
Weber et al., (2009), Goal-Direct Feature Learning, In: Proc, International Joint Conference on Neural Networks, 3319 3326.
Weber, C. et al, 'Robot docking with neural vision and reinforcement.' Knowledge-Based Systems vol. 17 No. 2 (2004): pp. 165-172.
Wennekers, T., Analysis of Spatio-temporal Patterns in Associative Networks of Spiking Neurons Artifical Neural Networks, 1999. 1CANN 99. Ninth International Conference on (Conf. Publ. No. 470) vol. 1 DOI:10.1049/cp:I9991116 Publication Year: 1999, vol. 1, pp. 245-250.
Werbos P.J. (1992), or Prokhorov D.V and Wunsch D.C. (1997) Adaptive Critic Designs, IEEE Trans Neural Networks, vol. 8, No. 5, pp. 997-1007.
White, D. A., & Sofge, D. A. (Eds.). (1992): Handbook of intelligent control. Neural, fuzzy, and adaptive approaches. Van Nostrand Reinhold-New York.
Widrow B. Hoff. M.E. (1960) Adaptive Switching Circuits, IRE WESCON Convention Record 4: 96-104.
Widrow, Bernard, Narendra K. Gupta, and Sidhartha Maitra. "Punish/reward: Learning with a critic in adaptive threshold systems." Systems, Man and Cybernetics, IEEE Transactions on 5 (1973): 455-465.
Williams (1992), Simple Statistical Gradient-Following Algorithms for Connectionist Reinforcement Learning, Machine Learning 8, 229-256.
Wiskott, et al., "Slow Feature Analysis", 2002, 29 pages.

(56) References Cited

OTHER PUBLICATIONS

Wiskott, L.; Sejnowski, T.J. Slow feature analysis: Unsupervised learning of invariances, Neural Computation, 2002, 14, (4), 715-770.

Wohns R.N.W., et al., Day Surgery for Anterior Cervical Microdiskectomy: Experience with 75 Cases, Jul. 11, 2002, pp. 1-3.

Wu, QingXiang, et al. "Remembering Key Features of Visual Images based on Spike Timing Dependent Plasticity of Spiking Neurons." Image and Signal Processing, 2009. CISP'09. 2nd International Congress on. IEEE, 2009.

Wysoski et al, "Fast and Adaptive Network of Spiking Neuron for Multi-view Visual Pattern Recognition", May 3, 2008, Elsevier,Neurocomputing vol. 71, pp. 2563-2575.

Xiaohui Xie and H. Sebastian Seung, "Learning in neural networks by reinforcement of irregular spiking", Physical Review E. vol. 69, letter 041909, 2004, pp. 1-10.

Yang Z., et al., "A Neuromorphic Depth-from-motion Vision Model with STDP Adaptation," IEEE Transactions on Neural Networks, 2006, vol. 17 (2), pp. 482-495.

Yi (2009), Stochastic search using the natural gradient, ICML '09 Proceedings of the 26th Annual International Conference on Machine Learning. New York, NY, USA.

Zarandy et al. "Bi-i: A Standalone Ultra High Speed Cellular Vision System." In: [online]. Dated Jun. 13, 2005 (Jun. 13, 2005). Retrieved on Aug. 16, 2012 (Aug. 16, 2012). Retrieved from the Internet at URL:http://ieeexplore.ieee.orgixplilogin.jsp?tp=tarnumber=14387388turl=http%3A%2Fieeexplore.ieee.org%2Fxpls%2Fabs_all.jsp% Farnumber%3D1438738<http:login.jsp?tp="&amumber=1438738&url=http%3A%2F%2Fiee"></http:>.

Zhou, Computation of Optical Flow Using a Neural Network, Published 1988.

\* cited by examiner

APPARATUS AND METHODS FOR EFFICACY BALANCING IN A SPIKING NEURON NETWORK

CROSS-REFERENCES TO RELATED APPLICATIONS

This application is related to commonly owned and/or co-pending U.S. patent application Ser. Nos. 13/152,084 entitled "APPARATUS AND METHODS FOR PULSE-CODE INVARIANT OBJECT RECOGNITION" filed Jun. 2, 2011, 13/152,119 entitled "SENSORY INPUT PROCESSING APPARATUS AND METHODS" filed Jun. 2, 2011, 13/541,531 entitled "CONDITIONAL PLASTICITY SPIKING NEURON NETWORK APPARATUS AND METHODS" filed Jul. 3, 2012, 13/774,934 entitled "APPARATUS AND METHODS FOR RATE-MODULATED PLASTICITY IN A NEURON NETWORK" filed Feb. 22, 2013, 13/763,005 entitled "SPIKING NETWORK APPARATUS AND METHOD WITH BIMODAL SPIKE-TIMING DEPENDENT PLASTICITY" filed Feb. 8, 2013, 13/487,533 entitled "SYSTEMS AND APPARATUS FOR IMPLEMENTING TASK-SPECIFIC LEARNING USING SPIKING NEURONS" filed Jun. 4, 2012, 12/869,583 entitled "INVARIANT PULSE LATENCY CODING SYSTEMS AND METHODS" filed Aug. 26, 2010, 13/757,607 entitled "TEMPORAL WINNER TAKES ALL SPIKING NEURON NETWORK SENSORY PROCESSING APPARATUS AND METHODS" filed Feb. 1, 2013, 13/756,372 entitled "SPIKING NEURON CLASSIFIER APPARATUS AND METHODS USING CONDITIONALLY INDEPENDENT SUBSETS" filed Jan. 31, 2013, 13/756,382 entitled "REDUCED LATENCY SPIKING NEURON CLASSIFIER APPARATUS AND METHODS" filed Jan. 31, 2013, 13/623,820 entitled "APPARATUS AND METHODS FOR ENCODING OF SENSORY DATA USING ARTIFICIAL SPIKING NEURONS" filed Sep. 20, 2012, 13/540,429 entitled "SENSORY PROCESSING APPARATUS AND METHODS" filed Jul. 2, 2012, 13/465,924 entitled "SPIKING NEURAL NETWORK FEEDBACK APPARATUS AND METHODS" filed May 7, 2012, 13/488,106 entitled "SPIKING NEURON NETWORK APPARATUS AND METHODS" filed Jun. 4, 2012, 13/548,071 entitled "SPIKING NEURON NETWORK SENSORY PROCESSING APPARATUS AND METHODS" filed Jul. 12, 2012, 13/660,967 entitled "APPARATUS AND METHODS FOR ACTIVITY-BASED PLASTICITY IN A SPIKING NEURON NETWORK" filed Oct. 25, 2012, 13/691,554 entitled "RATE STABILIZATION THROUGH PLASTICITY IN SPIKING NEURON NETWORK" filed Nov. 30, 2012, 13/922,116 entitled "APPARATUS AND METHODS FOR PROCESSING INPUTS IN AN ARTIFICIAL NEURON NETWORK" filed Jun. 19, 2013, 13/487,499 entitled "STOCHASTIC APPARATUS AND METHODS FOR IMPLEMENTING GENERALIZED LEARNING RULES" filed Jun. 4, 2012, 13/623,842 entitled "SPIKING NEURON NETWORK ADAPTIVE CONTROL APPARATUS AND METHODS" filed Sep. 20, 2012, 12/869,573 entitled "SYSTEMS AND METHODS FOR INVARIANT PULSE LATENCY CODING" filed Aug. 26, 2010, 13/117,048 entitled "APPARATUS AND METHODS FOR POLYCHRONOUS ENCODING AND MULTIPLEXING IN NEURONAL PROSTHETIC DEVICES" filed May 26, 2011, 13/152,084 entitled "APPARATUS AND METHODS FOR PULSE-CODE INVARIANT OBJECT RECOGNITION" filed Jun. 2, 2011, 13/239,255 entitled "APPARATUS AND METHODS FOR SYNAPTIC UPDATE IN A PULSE-CODED NETWORK" filed Sep. 21, 2011, 13/487,576 entitled "DYNAMICALLY RECONFIGURABLE STOCHASTIC LEARNING APPARATUS AND METHODS" filed Jun. 4, 2012, 13/152,105 entitled "APPARATUS AND METHODS FOR TEMPORALLY PROXIMATE OBJECT RECOGNITION" filed on Jun. 2, 2011, and U.S. Pat. No. 8,315,305, entitled "SYSTEMS AND METHODS FOR INVARIANT PULSE LATENCY CODING" issued Nov. 20, 2012, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates generally to artificial neuron networks and more particularly in one exemplary aspect to computerized apparatus and methods for implementing plasticity in spiking neuron networks.

Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary embodiments of such encoding are described in commonly owned U.S. patent application Ser. No. 13/152,084 entitled "APPARATUS AND METHODS FOR PULSE-CODE INVARIANT OBJECT RECOGNITION" filed Jun. 2, 2011, and U.S. patent application Ser. No. 13/152,119, filed Jun. 2, 2011, entitled "SENSORY INPUT PROCESSING APPARATUS AND METHODS", the foregoing each being incorporated herein by reference in its entirety.

Typically, artificial spiking neural networks, such as the exemplary network described in commonly owned and co-pending U.S. patent application Ser. No. 13/541,531, entitled "CONDITIONAL PLASTICITY SPIKING NEURON NETWORK APPARATUS AND METHODS" filed Jun. 3, 2012, incorporated herein by reference in its entirety, may comprise a plurality of units (or nodes), which can be thought of as corresponding to neurons in a biological neural network. Any given unit may be connected to one or many other units via connections, also referred to as communications channels, and/or synaptic connections. The units providing inputs to any given unit are commonly referred to as the pre-synaptic units, while the units receiving the inputs are referred to as the post-synaptic units.

Individual ones of the unit-to-unit connections may be assigned, inter alga, a connection efficacy, which in general may refer to a magnitude and/or probability of input spike influence on unit output response (e.g., output spike generation/firing). The efficacy may comprise, for example a parameter (e.g., synaptic weight) by which one or more state variables of post-synaptic unit are changed. The efficacy may comprise a latency parameter by characterizing propagation delay from a pre-synaptic unit to a post-synaptic unit. In some implementations, greater efficacy may correspond to a shorter latency.

Some existing implementations of learning (e.g., slow feature analysis) by spiking neural networks via spike timing dependent plasticity and/or increased excitability may produce connection efficacy that is either too strong (e.g., one on a scale from 0 to 1) or too weak (e.g., zero). Some existing plasticity rules may employ a priori caps (e.g., hard limits) on efficacy magnitude and/or utilize manual tuning during network operation. Efficacy constraints may impede network response to varying inputs, while manual tuning may prevent network autonomous operation.

Accordingly, methods and apparatus for implementing plasticity in spiking networks are needed which, inter alia, overcome the aforementioned disabilities.

SUMMARY

The present disclosure satisfies the foregoing needs by providing, inter alia, apparatus and methods for implementing plasticity in spiking neuron networks.

In a first aspect of the disclosure, a non-transitory computer-readable storage apparatus having instructions embodied thereon is disclosed. In one implementation, the instructions are configured to, when executed, implement logic configured to modify at least one plasticity rule in an artificial spiking neuron network.

In one variant, the modification is implemented by at least: modification of an efficacy of a plurality of connections between neurons of the network; determination of a statistical parameter associated with the modified efficacy; increase, when the determination indicates that the parameter is no greater than a threshold, of an efficacy adjustment magnitude for a subsequent efficacy modification; or decrease, when the determination indicates that the parameter is greater than the threshold, of the efficacy adjustment magnitude for the subsequent efficacy modification.

In another aspect, apparatus configured for sensory input processing is disclosed. In one implementation, the processing is conducted within a spiking neuron network, and the apparatus includes: a first plurality of nodes configured to generate a spiking signal based at least on the sensory input; a second plurality of nodes configured to generate one or more output spikes based at least on receipt of the spiking signal via a plurality of connections; and a logic module configured to evaluate an efficacy of the plurality of connections, and to modulate adjustment of the efficacy of the plurality of connections based at least on the efficacy evaluation.

In a further aspect, a method of managing a plurality of connections in a neuron network is disclosed. In one implementation, the connections are operable in accordance with a plasticity rule, and the method includes: determining a statistical parameter associated with an efficacy of the plurality of connections; evaluating the statistical parameter based at least on the target efficacy; and modifying the plasticity rule based at least on the evaluation.

In another aspect, a spiking neuron network having at least one plasticity rule associated therewith is disclosed.

In a further aspect, computerized logic configured to implement one or more plasticity rules within a spiking neuron network is disclosed. These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
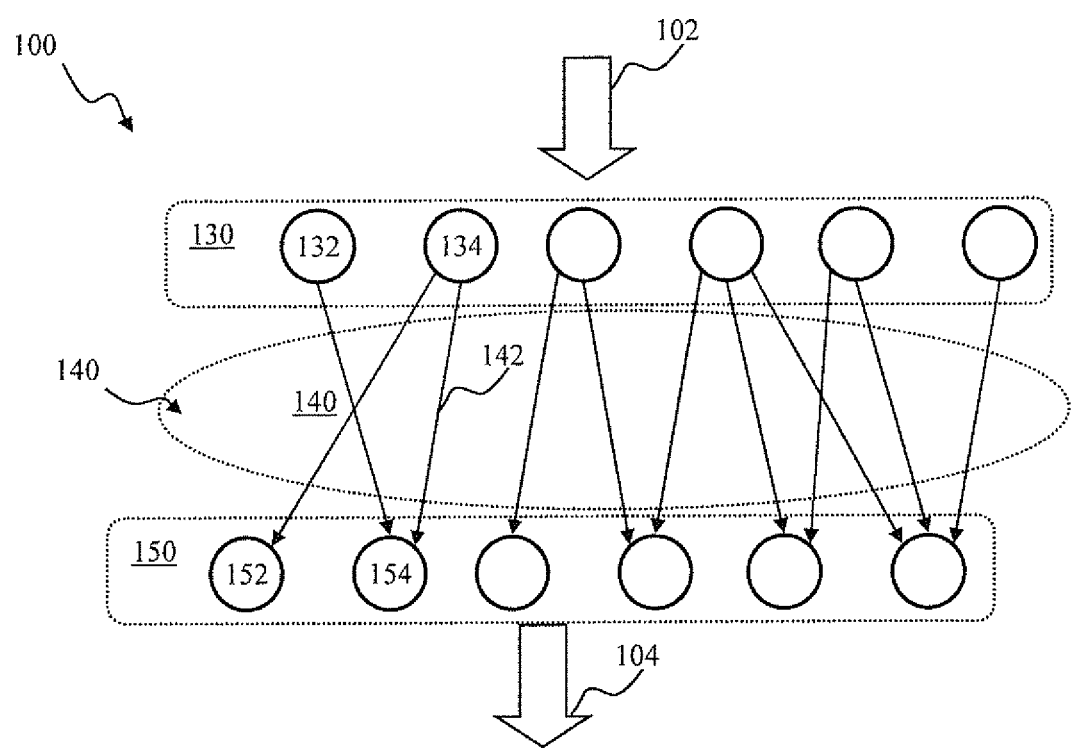
FIG. 1 is a graphical illustration of a network comprising a plurality of connections between two layers of units, according to one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing e.g., different memories in a pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computing (RISC) processors, complex instruction set computing (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal e.g., a rapid change in some characteristic of a signal e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

In one aspect of the disclosure, apparatus and methods for plasticity design are directed at implementing efficacy balancing in a spiking neuron network. The present disclosure provides, in one salient aspect, apparatus and methods for implementing mechanism for processing of excitatory stimulus by a computerized neuron network.

Referring now to FIG. 1, one implementation of a network comprising a plurality of connections is shown and described. The network 100 may comprise a first neuron layer 130 and a second neuron layer 150. Individual neurons (e.g., 132, 134) of the layer 130 may be coupled to layer 150 neurons (e.g., 152, 154) via multiple connections 140. Connection layer 140 connectivity may be configured in accordance with a variety of rules e.g., one-to-one, one-to-all, all-to-one, some to some, and/or other methods.

Individual connections (e.g., 142) may be characterized by connection efficacy. Connection efficacy, which in general may refer to a magnitude and/or probability of input spike influence on neuronal response (e.g., output spike generation or firing), and may comprise, for example a parameter—synaptic weight—by which one or more state variables of post synaptic unit may be changed). During operation of the pulse-code network (e.g., 100), synaptic weights may be dynamically adjusted using what is referred to as the spike-timing dependent plasticity (STDP) in order to implement, among other things, network learning. In one or more implementations, the STDP mechanism may comprise a rate-modulated plasticity mechanism such as for example those described in commonly owned and co-pending U.S. patent application Ser. No. 13/774,934, entitled "APPARATUS AND METHODS FOR RATE-MODULATED PLASTICITY IN A SPIKING NEURON NETWORK" filed Feb. 22, 2013, and/or a bi-modal plasticity mechanism, for example, such as described in commonly owned and co-pending U.S. patent application Ser. No. 13/763,005, entitled "SPIKING NETWORK APPARATUS AND METHOD WITH BIMODAL SPIKE-TIMING DEPENDENT PLASTICITY" filed Feb. 8, 2013, each of the foregoing being incorporated herein by reference in its entirety.

Individual spiking neurons (e.g., 132, 134, 152, 154) may be characterized by internal state. The internal state may, for example, comprise a membrane voltage of the neuron, conductance of the membrane, and/or other parameters. The neuron process may be characterized by one or more learning parameters which may comprise input connection efficacy, output connection efficacy, training input connection efficacy, response generating (firing) threshold, resting potential of the neuron, and/or other parameters. In one or more implementations, some learning parameters may comprise probabilities of signal transmission between the units (e.g., neurons) of the network.

During operation, data (e.g., spike events) associated with neurons of the network 100 may cause changes in the neuron state (e.g., increase neuron membrane potential and/or other parameters). Changes in the neuron state may cause the neuron to generate a response (e.g., output a spike). Teaching data may be absent during operation, while input data are required for the neuron to generate output.

Various neuron dynamic processes may be utilized with the methodology of the present disclosure including for example, integrate-and-fire (IF), Izhikevich simple model, spike response process (SRP), stochastic process such as, for example, described in commonly owned U.S. patent application Ser. No. 13/487,533, entitled "SYSTEMS AND APPARATUS FOR IMPLEMENTING TASK-SPECIFIC LEARNING USING SPIKING NEURONS" filed Jun. 4, 2012 and issued as U.S. Pat. No. 9,146,546 on Sep. 29, 2015, incorporated herein by reference in its entirety. In some implementations, the network may comprise a heterogeneous neuron population comprising neurons of two or more types governed by their respective processes.

The first neuron layer 130 may receive input stimulus 102. The stimulus 102 may comprise a plurality of spikes generated based on sensory input. The sensory input may comprise, for example, an audio signal, a stream of video frames, and/or other input. In some implementations, such as described with respect to FIG. 9) the sensory input may comprise image frames received from an image sensor (such as a charge-coupled device (CCD), CMOS device, and/or an active-pixel sensor (APS), photodiode arrays, etc.). In one or more implementations, the input may comprise a pixel stream downloaded from a file, such as a stream of two-dimensional matrices of red green blue (RGB) values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, etc.) are equally applicable to and useful with the various aspects of the present disclosure. Furthermore, data frames corresponding to other (non-visual) signal modalities such as sonograms, IR, radar or tomography images are equally compatible with the processing methodology of the disclosure, or yet other configurations.

Neurons of the layer 130 may generate a plurality of responses (spikes) that may be transmitted to neurons of the layer 150 via the connections 140. Neurons of the layer 150 may be configured in accordance with dynamic process that may be configured to adjust process parameters (e.g., excitability) based on timing of received input spikes and/or efficacy of connections 140. The process may be updated at time intervals. In some implementations, the process update may be effectuated on a periodic basis at Δt=1 ms intervals. Neuron excitability parameters (e.g., membrane potential v(t)) may be updated using, for example, the following update process:

$$v(t) \sim F(v(t-\Delta t), t, I(t)) \qquad \text{(Eqn. 1)}$$

where Δt is iteration time step, and the function F( ) describes neuron process dynamics, and I(t) is input into the neuron via one or more connections (e.g., 142).

When the excitability breaches a threshold (also referred to as the firing threshold) the neuron may generate a response. Responses 104 of the neuron layer 150 may be communicated to a subsequent neuron layer and/or another network entity (e.g., a motor actuation block).

In some implementations, the network 100 may encode the sensory input into spike latency, for example as described in commonly owned and co-pending U.S. patent application Ser. No. 12/869,583 filed Aug. 26, 2010 and entitled "INVARIANT PULSE LATENCY CODING SYSTEMS AND METHODS"; commonly owned U.S. Pat. No. 8,315,305, issued Nov. 20, 2012, entitled "SYSTEMS AND METHODS FOR INVARIANT PULSE LATENCY COD- ING"; commonly owned and co-pending U.S. patent application Ser. No. 13/152,084 filed Jun. 2, 2011, entitled "APPARATUS AND METHODS FOR PULSE-CODE INVARIANT OBJECT RECOGNITION"; and/or latency encoding comprising a temporal winner take all mechanism described in commonly owned and co-pending U.S. patent application Ser. No. 13/757,607 filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In some implementations, latency encoding may be employed for object recognition and/or classification may be implemented using spiking neuron classifiers comprising conditionally independent subsets, such as e.g., those described in commonly owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS", issued as U.S. Pat. No. 9,195,934 on Nov. 24, 2015 and/or commonly owned and co-pending U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may be based on adaptive adjustment of neuron parameters, such as is described in commonly owned and co-pending U.S. patent application Ser. No. 13/623,820 entitled "APPARATUS AND METHODS FOR ENCODING OF SENSORY DATA USING ARTIFICIAL SPIKING NEURONS" filed Sep. 20, 2012, and/or commonly owned and co-pending U.S. patent application Ser. No. 13/540,429, entitled "SENSORY PROCESSING APPARATUS AND METHODS" filed Jul. 2, 2012, each of the foregoing being incorporated herein by reference in its entirety.

In one or more implementations, encoding may be effectuated by a network comprising a plasticity mechanism such as, for example, the mechanisms described in commonly owned and co-pending U.S. patent application Ser. No. 13/465,924, entitled "SPIKING NEURAL NETWORK FEEDBACK APPARATUS AND METHODS" filed May 7, 2012, commonly owned and co-pending U.S. patent application Ser. No. 13/488,106, entitled "SPIKING NEURON NETWORK APPARATUS AND METHODS" filed Jun. 4, 2012, commonly owned and co-pending U.S. patent application Ser. No. 13/541,531, entitled "CONDITIONAL PLASTICITY SPIKING NEURON NETWORK APPARATUS AND METHODS" filed Jul. 3, 2012, commonly owned and co-pending U.S. patent application Ser. No. 13/548,071, entitled "SPIKING NEURON NETWORK SENSORY PROCESSING APPARATUS AND METHODS" filed Jul. 12, 2012, commonly owned and co-pending U.S. patent application Ser. No. 13/660,967, entitled "APPARATUS AND METHODS FOR ACTIVITY-BASED PLASTICITY IN A SPIKING NEURON NETWORK" filed Oct. 25, 2012, commonly owned and co-pending U.S. patent application Ser. No. 13/691,554, entitled "RATE STABILIZATION THROUGH PLASTICITY IN SPIKING NEURON NETWORK" filed Nov. 30, 2012, each of the foregoing incorporated by reference herein in its entirety.

In some implementations, the input encoding may comprise transformation of inputs into neurons, for example, such as described in commonly owned and co-pending U.S. patent application Ser. No. 13/922,116, entitled "APPARATUS AND METHODS FOR PROCESSING INPUTS IN AN ARTIFICIAL NEURON NETWORK" filed Jun. 19, 2013, incorporated herein by reference in its entirety. The above-referenced input transformation may be employed to extend the useful range of signal latency encoding and/or to stabilize neuron operation in the presence of multiple (e.g., in excess of 1000) strong inputs.

Figure 2A:
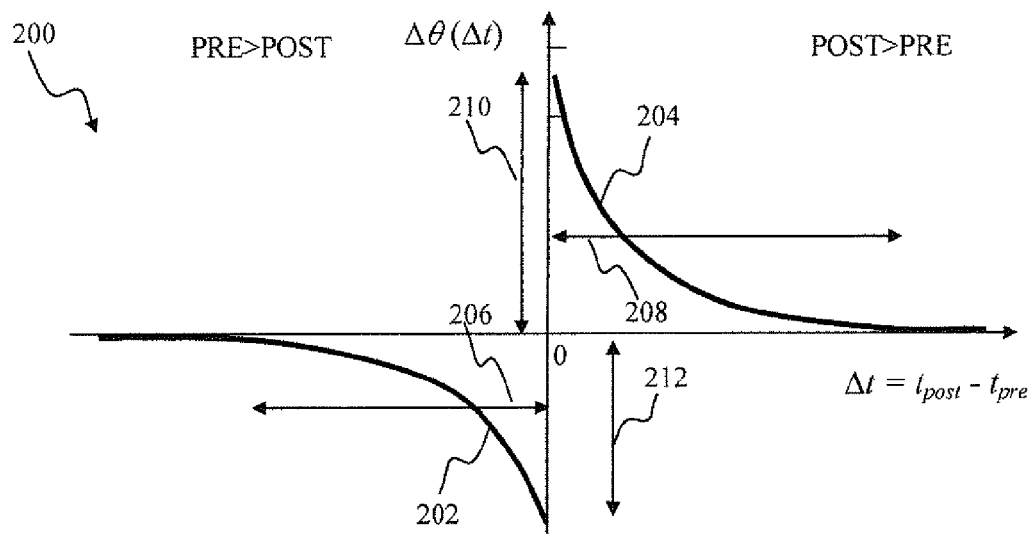
FIG. 2A is a plot depicting a plasticity rule comprising potentiation and depression portions with varying magnitude, according to one or more implementations.
Figure 2B:
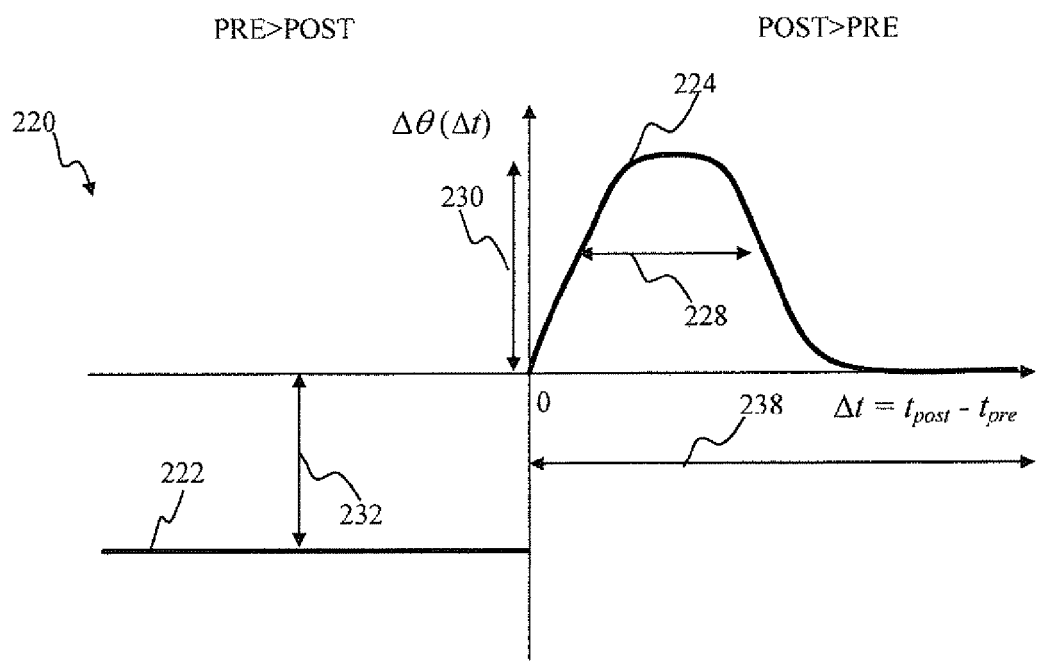
FIG. 2B is a plot depicting a plasticity rule comprising a varying magnitude potentiation portion and a constant magnitude depression portion, according to one or more implementations.

FIGS. 2A-2B present plasticity rules useful with the efficacy balancing methodology of the disclosure. Efficacy corresponding to the plasticity rules 200, 220 may comprise a synaptic weight parameter by which one or more state variables of a post-synaptic neuron may be modified.

The plotted plasticity rules of FIGS. 2A-2B depict an efficacy change $(x)$ of a connection (e.g., 142 in FIG. 1) as a function of a time interval $(x) t=t_{post}-t_{pre}$ between an event (e.g., a spike) that may be associated with a post-synaptic neuron (e.g., 154) and an event that may be associated with a pre-synaptic neuron (e.g., 134). The plasticity rules 200, 220 of FIGS. 2A-2B, respectively, may be configured to comprise causal potentiation. That is: when the post-synaptic event occurs subsequent to the pre-synaptic event within a period of time $T_p$: $(T_p > (x) t > 0)$ the efficacy may be increased $((x) > 0)$, and when the post-synaptic event occurs prior to the pre-synaptic event $((x) t < 0)$ the efficacy may be decreased $((x) > 0)$. The weight increase (e.g., the curves 204, 224 in FIGS. 2A-2B) may be referred to as connection potentiation; the weight decrease (e.g., the curves 202, 222 in FIGS. 2A-2B) may be referred to as connection depression. Connection potentiation/depression may be configured to advance/delay, respectively, response generation by the post-synaptic neuron responsive to input from the pre-synaptic neuron. In some implementations of stochastic spiking networks, for example, as described in commonly owned U.S. patent application Ser. No. 13/487,499, entitled "STOCHASTIC APPARATUS AND METHODS FOR IMPLEMENTING GENERALIZED LEARNING RULES" filed Jun. 4, 2012 and issued as U.S. Pat. No. 9,104,186 on Aug. 11, 2015, incorporated herein by reference in its entirety; connection potentiation/depression may be configured to increase/reduce, respectively, the probability of the response generation.

Potentiation and/or depression magnitudes may be referenced to the magnitude 210 (also referred to as weight change magnitude dwmax). For clarity, dwmax may be set to unity in some implementations. The causal portion may be characterized by a maximum time interval $\Delta t_{max}$ (e.g., 228) between the post-synaptic and the pre-synaptic events. The interval 228 may be configured such that pre-synaptic events that may precede the post-synaptic event by a time in excess of the maximum time interval 228 may not cause connection potentiation (e.g., the efficacy is maintained unchanged as ($\Delta \theta$=0, $\Delta t > \Delta t_{max}$) as shown in FIG. 2B.

The casual 204 and the anti-casual 202 portions of the rule 200 may be configured to decay exponentially with a delay between the pre-synaptic input and the post-synaptic events. In one or more implementations, the decay time scale 208 may comprise an e-folding duration (i.e., the duration where the magnitude is reduced by factor of 1/exp(1) that may be configured to be between 10 ms and 50 ms.

The magnitude of the efficacy adjustments (e.g., shown by arrows 210, 212, 230, 232 in FIGS. 2A-2B) and/or the time intervals (208, 228, 238) associated with e.g., the connection potentiation may be modulated in accordance with any number of applicable methodologies described herein.

As will be appreciated by those skilled in the arts, the rules illustrated in FIGS. 2A-2B are merely exemplary and various other plasticity rules e.g., as described in the above referenced applications (U.S. patent application Ser. No. 13/774,934, entitled "APPARATUS AND METHODS FOR RATE-MODULATED PLASTICITY IN A NEURON NETWORK" filed Feb. 22, 2013, and/or Ser. No. 13/763,005, entitled "SPIKING NETWORK APPARATUS AND METHOD WITH BIMODAL SPIKE-TIMING DEPENDENT PLASTICITY" filed Feb. 8, 2013, incorporated supra) may be utilized with various aspects of the present disclosure.

Figure 4:
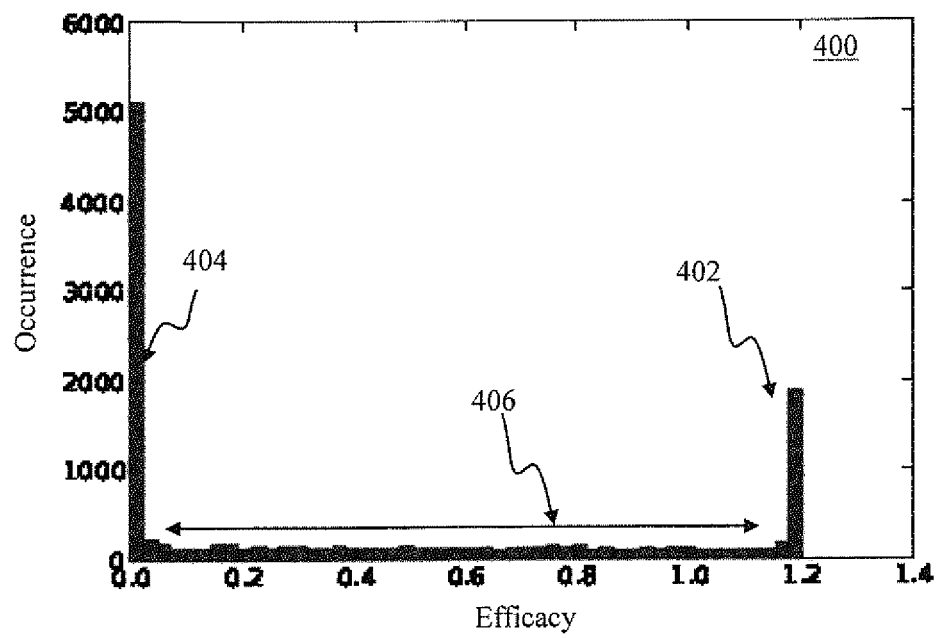
FIG. 4 is a plot depicting a histogram of connection weights distribution corresponding to data shown in FIG. 3A, according to one or more implementations.

During operation of a network (e.g., 100 in FIG. 1) efficacy of connections (e.g., 142) may be adjusted using e.g., plasticity rule 200 or 220 of FIGS. 2A-2B. Operation of the network may be improved by causing a greater portion of connections (e.g., within the connection layer 140) to form a bimodal weight distribution (e.g., as shown in FIG. 4). In some implementations of connection synaptic weights, the bimodal distribution may be characterized by a low weight mode (e.g., below 0.1); and a high weight mode (e.g., above 0.9).

Figure 6:
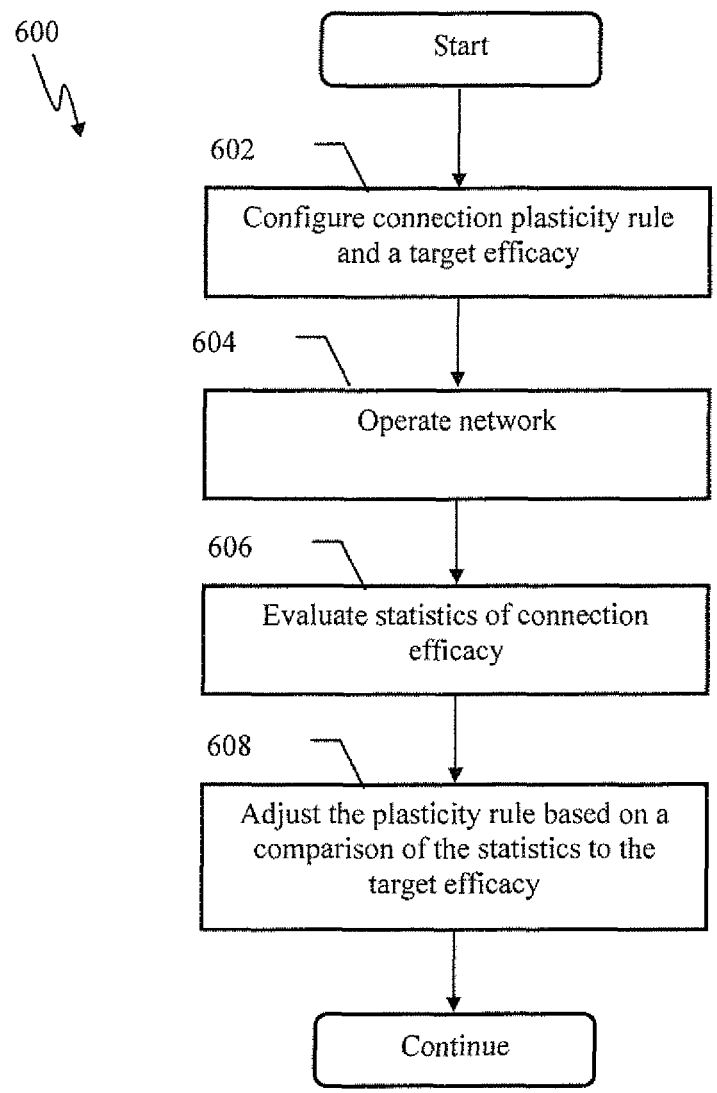
FIG. 6 is a logical flow diagram illustrating a method of efficacy balancing in a spiking neuron network, in accordance with one or more implementations.
Figure 7:
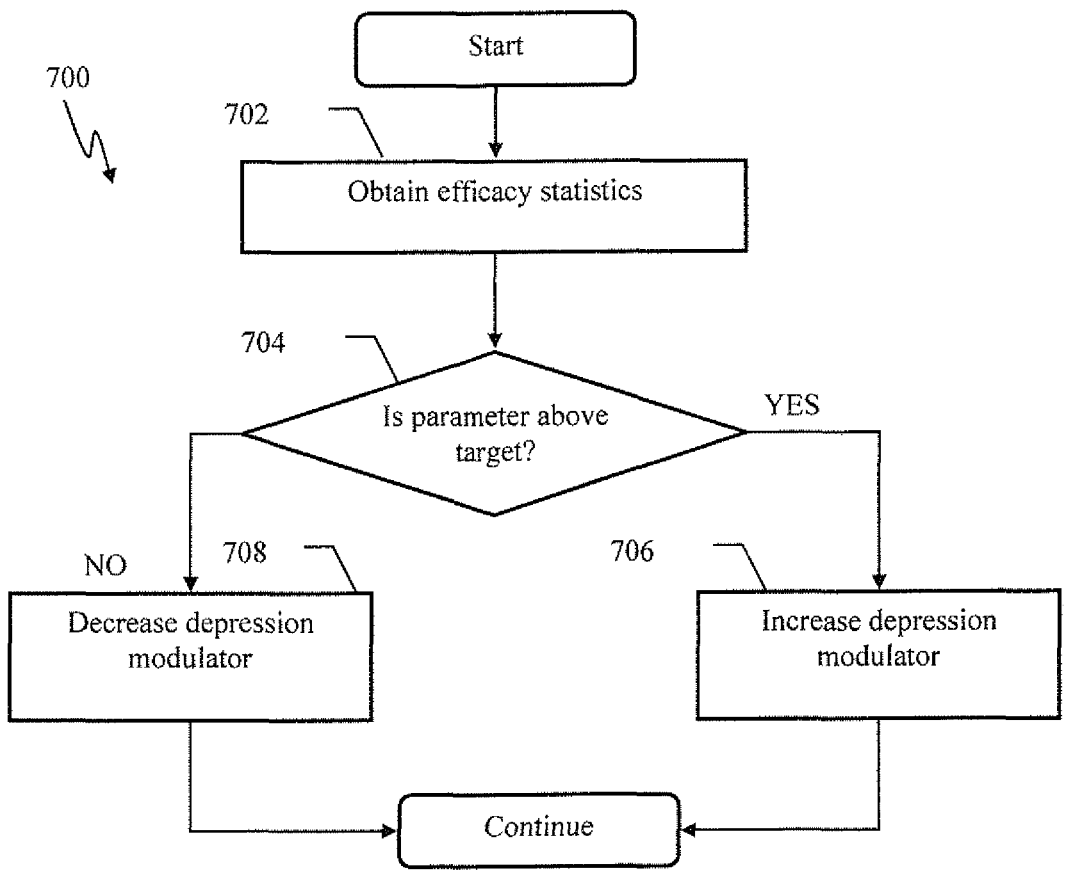
FIG. 7 is a logical flow diagram illustrating a method of plasticity modulation for a spiking neuron network based on efficacy statistics, in accordance with one or more implementations.
Figure 8:
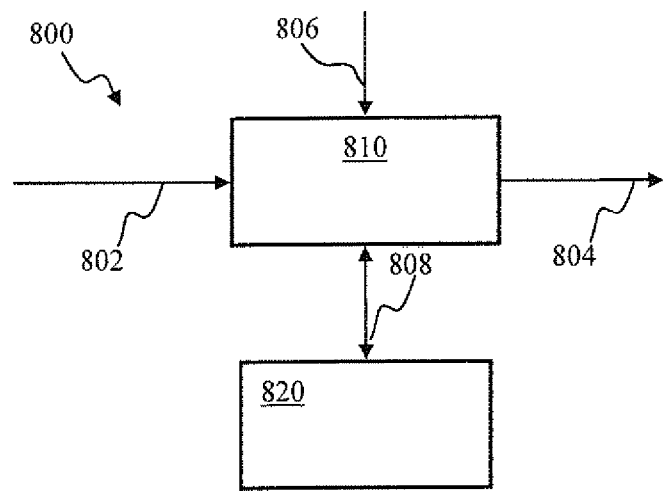
FIG. 8 is a block diagram illustrating a controller apparatus useful for efficacy balancing in a spiking neuron network, in accordance with one or more implementations.

FIGS. 6-7 illustrate exemplary methods of using the efficacy balancing mechanism(s) described herein for operating neuron networks. The operation of the exemplary methods 600, 700 presented below are intended to be merely illustrative, and in no way limiting on the broader principles of the disclosure. In some implementations, methods 600, 700 may be accomplished with one or more additional operations not described, and/or without one or more of the operations discussed. Additionally, the order in which the operations of methods 600, 700 (or individual steps or sub-steps therein) are illustrated in FIGS. 6-8 and described below is not intended to be limiting.

In some implementations, the methods 600, 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 700 in response to instructions stored electronically on an electronic storage medium. The one or more processing devices may include one or more devices configured through hardware, firmware, and/or software to be specifically designed for execution of one or more of the operations of the methods 600, 700.

At operation 602 of the method 600, illustrated in FIG. 6, a plasticity framework of a network (e.g., 100 in FIG. 1) may be configured. In some implementations, the plasticity framework configuration may comprise (i) selection of an STDP rule for a layer of connections (e.g., 140) between two layers of the network (e.g., 130 and 150); and (ii) selecting a target viable connection efficacy. In some implementations, the viable connection efficacy may be configured as a fixed value (e.g., 0.5). In one or more implementations, the target efficacy may vary in accordance with a function of average activity (e.g., number of spikes per a unit of time) within the network. In some implementations, the STDP rule may be configured in accordance with the rules described with respect to FIGS. 2A-2B. In some implementations, initial efficacy values may be set to zero and/or assigned randomly within a range of efficacies (e.g., 0 to 1.2).

Figure 3A:
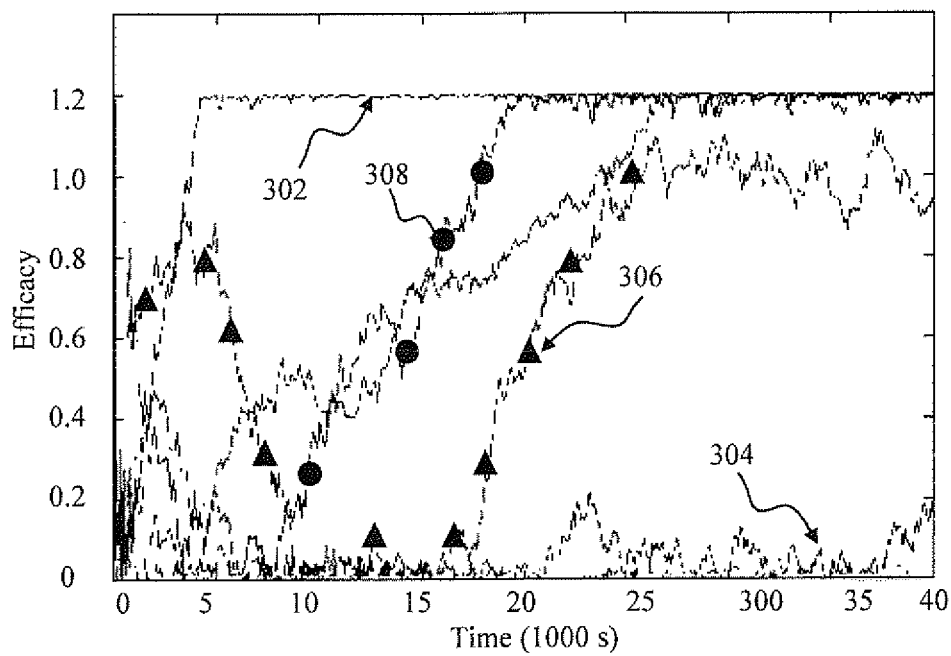
FIG. 3A is a plot depicting a time evolution of connections weights in a network operable based on the plasticity configuration of FIG. 2B, according to one or more implementations.
Figure 3B:
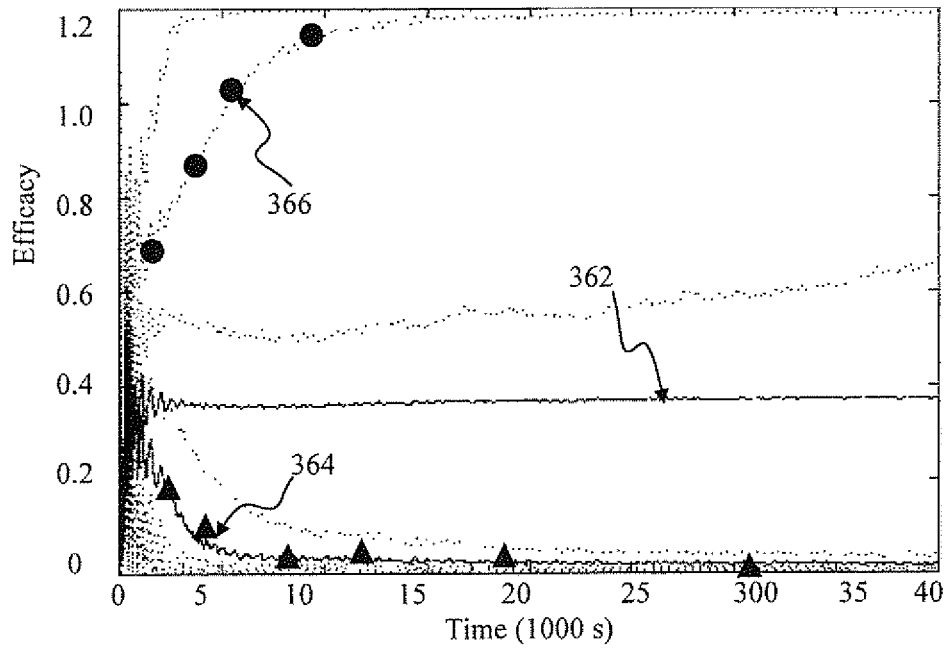
FIG. 3B is a plot depicting a time evolution of connections weights statistics corresponding to data shown in FIG. 3A, according to one or more implementations.

At operation 604 of the method 600, the network may be operated to e.g., process input. The input may comprise sensory input e.g., as described with respect to FIG. 1, above. During network operation, weights of the network connections (e.g., of network 100 connection layer 140) may be adjusted in accordance with the STDP rule configured at operation 602. Updates of network neuron states and/or connection weight may be implemented at 1 ms intervals;

for example, the data shown in FIGS. 3A-3B correspond to 50,000 of updates. FIG. 3A illustrate connection weight evolution during the network operation. FIG. 3B illustrate statistics of the connection weight evolution of FIG. 3A. The network associated with the data presented in FIGS. 3A-3B comprises two 100 neuron layers interconnected by 5000 connections. Data presented in FIGS. 3A-3B correspond to network operation based on the plasticity rules of FIG. 2B. Individual, curves in FIG. 3A (e.g., 302) depict the weight evolution for individual connections as a function of time. Weight of some connections (e.g., shown by the curve 302 in FIG. 3A) may rapidly increase from a low value (e.g., <0.1) to a high value (e.g., >1). Weight of some connections (e.g., shown by the curve 304 in FIG. 3A) may rapidly converge to the low value (e.g., <0.1). Weight of some connections (e.g., shown by the curve 308 in FIG. 3A) may gradually converge to a high value (e.g., >1). Weight of some connections (e.g., shown by the curve 306 in FIG. 3A) may oscillate between the low and the high values.

FIG. 3B illustrate statistics of the connection weight evolution of FIG. 3A. Solid curve 362 depicts evolution of mean weight. Individual curves in FIG. 3B depict different percentile of weight distribution (e.g., the curve 366 marked with solid circles depicts 80% while the curve 364 marked with solid triangles depicts the median weight evolution. It is noteworthy that while mean weight of the connection population remains approximately constant throughout the network operation associated with the data shown in FIGS. 3A-3B, the median of the distribution gradually decreases within the first 10,000s of the network operation.

At operation 606 of the method 600, the population statistics of efficacy evolution for the connections within the network layer may be determined. In one or more implementations, the population statistics may comprise determination of a sample mean, median, a percentile ranking, and/or other statistical parameter, e.g., as described with respect to FIG. 3B.

FIG. 4 illustrates histogram of connection efficacy for the network implementation operable in accordance with the plasticity rules 220 of FIG. 2B, described above. The distribution 400 of FIG. 4 is characterized by two well-isolated modes 402, 404. A ratio of the mode width to mode separation 406 for the data of FIG. 4 is greater than 50.

At operation 608 of the method 600, the plasticity rule may be adjusted based on a comparison of the network efficacy statistics to the target efficacy (e.g., configured at operation 602). In one or more implementations, the plasticity rule adjustment may comprise modulating one or more plasticity rule parameters e.g., potentiation and/or depression magnitude 210, 230, 212, 232; and/or potentiation window 208, 228, of FIGS. 2A-2B, as described in detail with respect to FIGS. 5, 7, below.

FIG. 7 illustrates an exemplary method of STDP rule modulation for a spiking neuron network configured based on efficacy statistics in accordance with one or more implementations.

At operation 702 of method 700, illustrated in FIG. 7, the efficacy statistical parameter(s) may be obtained. The efficacy statistics determination may be based on operating the network while adjusting efficacy of connections for a period of time e.g., as described with respect to FIGS. 3A-4B. In one or more implementations, the efficacy population statistics may comprise determination of a sample mean, median, a percentile ranking, and/or other statistical parameter.

At operation 704 of the method 700, a determination may be made as to whether the statistical parameter obtained at operation 702 exceeds a target value. In some implementations, the target value may comprise mean connection weight e.g., as described with respect to operation 602 of FIG. 6.

Figure 5:
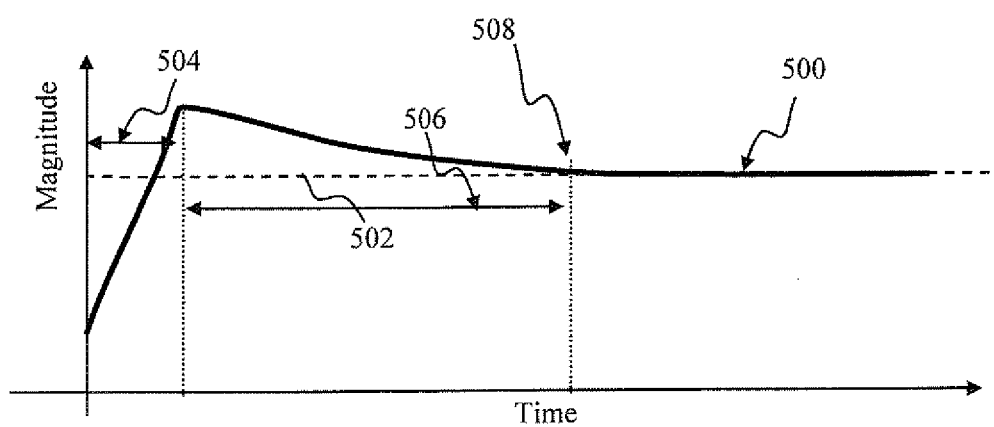
FIG. 5 is a plot depicting a time evolution of a plasticity modulation parameter used for efficacy balancing in a spiking neuron network, according to one or more implementations.

Responsive to a determination at operation 704 that the parameter is above the target value, the plasticity modulation may be adjusted. In some implementations, e.g., as illustrated in FIG. 7 and FIG. 5, the modulation may comprise increasing depression magnitude modulation parameter. FIG. 5 presents a plasticity modulation parameter time series useful with the plasticity adjustment mechanism of method 700. The modulation parameter shown by curve 500 in FIG. 5 may be used to modulate (e.g., increase/decrease) the magnitude of connection depression (e.g., 212, 232 in FIGS. 2A-2B). During the interval 504, the modulation parameter may be increased from its initial value. The modulation parameter increase may be performed responsive to a determination at operation 704 of method 700. In one or more implementations of e.g., the plasticity rules shown in FIGS. 2A-2B and the connection efficacy data of FIGS. 3A-4B, the modulation parameter may be varied between 0 and 100.

Responsive to a determination at operation 704 that the statistical parameter is below the target value, the plasticity depression modulator may be decreased e.g., as shown by the time interval 506 in FIG. 5.

Based on the determination that the efficacy statistical parameter reached the target (e.g., at time instance 508 in FIG. 5), the plasticity modulator 500 may be maintained at and/or near a steady state level e.g., the level shown by broken line 502 in FIG. 5.

Other modulation implementations may be utilized for balancing connection efficacy, including for example, varying potentiation magnitude (e.g., 210, 230), varying potentiation and/or depression time window (e.g., 202, 208, 228), and/or a combination thereof in one or more implementations.

The efficacy of connections between an input and an output layer of a network (e.g., the layers 130, 150 of the network 100 of FIG. 1) may vary with time. In some implementations e.g., as illustrated by the curve 306 in FIG. 3A, the variation may comprise oscillations. In some implementations e.g., as illustrated by the curve 308 in FIG. 3A, the variation may comprise drift. The drift may be characterized by a natural maximal rate of drift $V(P,F_i,F_o)$, where P is a plasticity rate that may be a characteristic of the plasticity rule (e.g., 200, 220 in FIGS. 2A-2B), $F_i, F_o$ are average firing rates of input and outputs neuron layers. The drift rate V may increase with the increase of the plasticity rate. The maximum drift rate may be used to describe how fast a synaptic weight may transition from a minimum to a maximum value e.g., from 0.05 to 1.2 in FIG. 3A. The maximum drift rate may be utilized in order to determine the minimum period of efficacy oscillation Tmin.

Plasticity rule adjustments aimed at balancing the efficacy of multiple network connections (e.g., as that described with respect to FIGS. 2A-7) may be configured in accordance with time scales of efficacy variations (e.g., the period Tmin). In some implementations, periodicity of determining efficacy statistics and/or plasticity modulations (e.g., plotted relationship of the parameter 500 in FIG. 5) may be configured to occur at least 3 times during the minimum period of efficacy oscillation Tmin.

In spiking network implementations comprising larger number of synapses (e.g., greater than 1,000,000), the periodicity of efficacy statistics determination and/or plasticity modulation may be reduced, compared to a smaller network, in order to, inter alia, reduce energy use associated with network operation, and/or be able to utilize less complex and/or less expensive hardware computational platform. Less frequent plasticity modulation may be utilized in implementations wherein efficacy variations may occur on longer time scales (e.g., minutes to days). In some implementations, where efficacy variations may occur on faster time scales, more frequent plasticity rule updates may be utilized.

Various exemplary spiking network apparatus configured to perform one or more of the methods set forth herein (e.g., efficacy balancing) may be utilized. In one or more implementations, the processing apparatus may comprise one or more of a multi-core general purpose processor (e.g., Intel® Core i7®, Xeon®), a multi-core specialized processor (e.g., a graphics processing unit (GPU)), a multi-core DSP, a multi-core neuromorphic processing unit (NPU)), FPGA, an embedded system on a chip (SoC), a processing core (e.g., RISC/CISC), an ASIC, a neuromorphic processor (e.g., processing apparatus 1145, 1150 of FIGS. 10C-10D), a computing cluster, and/or Cloud computing services.

FIG. 8 illustrates one implementation of an adaptive system for use with the efficacy balancing methodology described herein. The system 800 of FIG. 8 may comprise an adaptive controller apparatus 820 coupled to a spiking neuron network apparatus 810. The network apparatus 810 may be configured to process input 802 and to generate an output 804. In some implementations, the sensory input may comprise video input and the output may comprise signal indicative of a presence of an object within the input. The network apparatus 810 may comprise the apparatus 1000 described with respect to FIG. 9 below.

In some implementations, the network apparatus 810 operation may be configured based on a training input 808. The training input may be differentiated from sensory inputs (e.g., inputs 802) as follows. During learning, data (e.g., spike events) arriving to neurons of the network via input 806 may cause changes in the neuron state (e.g., increase neuron membrane potential and/or other parameters). Changes in the neuron state may cause the neuron to generate a response (e.g., output a spike). Teaching data arriving at neurons of the network may cause (i) changes in the neuron dynamic model (e.g., modification of parameters a, b, c, d of Izhikevich neuron model, described for example in commonly owned and co-pending U.S. patent application Ser. No. 13/623,842, entitled "SPIKING NEURON NETWORK ADAPTIVE CONTROL APPARATUS AND METHODS" filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, a teaching signal may be communicated to other components of the control system.

The spiking network of the apparatus 810 may comprise the balanced efficacy methodology described herein. The controller 820 may be configured to effectuate the efficacy adjustment using any of the methodologies (e.g., as those described with respect to FIGS. 6 and 7 above) described herein. The controller 820 may be coupled to the network apparatus 810 via an operable link 808. The link 808 may comprise one or more serial links, a network bus, a computer bus, a memory address space, and/or other link useful for communicating efficacy data from the network and plasticity rule parameters to the network. The controller 820 may operate with any number of adaptive methodologies e.g., a proportional-integral-derivative (PID) controller in some implementations.

The controller 820 may operate in accordance with a learning process (e.g., reinforcement learning and/or supervised learning). In one or more implementations, the controller 820 may optimize performance (e.g., performance of the system 800 of FIG. 8) by minimizing average value of a performance function as described in detail in commonly owned U.S. patent application Ser. No. 13/487,533, entitled "SYSTEMS AND APPARATUS FOR IMPLEMENTING TASK-SPECIFIC LEARNING USING SPIKING NEURONS " and filed Jun. 4, 2012, incorporated supra.

The learning process of adaptive controller (e.g., 820 of FIG. 8) may be implemented using a variety of methodologies. In some implementations, the controller 820 may comprise an artificial neuron network e.g., spiking neuron network described in co-owned U.S. patent application Ser. No. 13/487,533, entitled "SYSTEMS AND APPARATUS FOR IMPLEMENTING TASK-SPECIFIC LEARNING USING SPIKING NEURONS" filed Jun. 4, 2012 and issued as U.S. Pat. No. 9,146,546 on Sep. 29, 2015, incorporated supra, configured to control, for example, a robotic rover.

The controller 820 may comprise logic e.g., plurality of instructions executable by a processor. In some implementations, the logic effectuating plasticity modulation may be embodied within the network processing apparatus (e.g., 810 in FIG. 8).

Various aspects of the present disclosure may be applied to the design and operation of apparatus configured to process sensory data.

Figure 9:
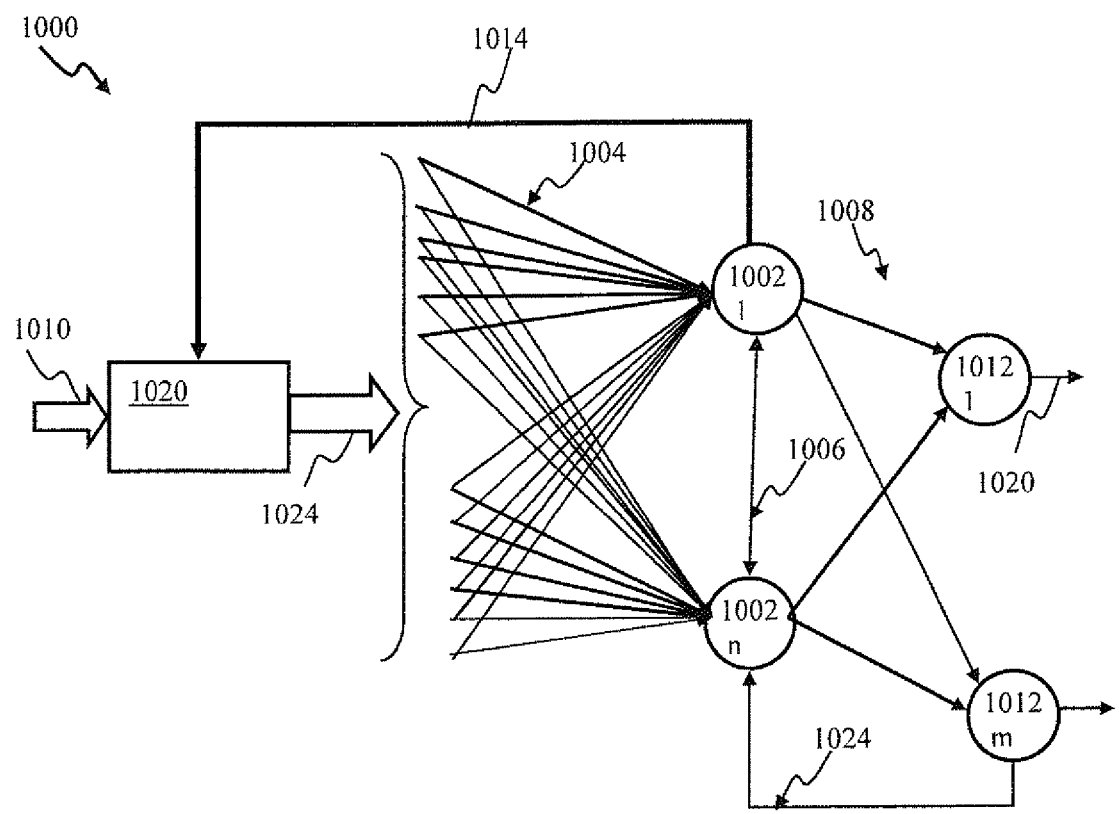
FIG. 9 is a block diagram illustrating a sensory processing apparatus comprising a balanced efficacy mechanism in accordance with one or more implementations.

One exemplary apparatus for processing of sensory information (e.g., visual, audio, somatosensory) using a spiking neural network (including one or more of the efficacy balancing mechanisms described herein) is shown in FIG. 9. The illustrated processing apparatus 1000 includes an input interface configured to receive an input sensory signal 1010. In some implementations, this sensory input may comprise electromagnetic waves (e.g., visible light, IR, UV, and/or other wavelength) entering an imaging sensor array (comprising RGCs, a charge coupled device (CCD), CMOS device, or an active-pixel sensor (APS)). The input signal in this example is a sequence of images (image frames) received from a CCD or a CMOS camera via a receiver apparatus, or downloaded from a file. Alternatively, the image may be a two-dimensional matrix of RGB values refreshed at a 25 Hz frame rate. It will be appreciated by those skilled in the art that the above image parameters and components are merely exemplary, and many other image representations (e.g., bitmap, CMYK, grayscale, and/or another representation) and/or frame rates may be utilized with the present disclosure.

The apparatus 1000 may comprise an encoder 1020 configured to transform (encode) the input signal so as to form an encoded signal 1024. In one variant, the encoded signal comprises a plurality of pulses (also referred to as a group of pulses) configured to model neuron behavior. The encoded signal 1024 may be communicated from the encoder 1020 via multiple connections (also referred to as transmission channels, communication channels, or synaptic connections) 1004 to one or more neuronal nodes (also referred to as the detectors) 1002.

In the implementation of FIG. 9, different detectors of the same hierarchical layer are denoted by an "_n" designator, such that e.g., the designator 1002_1 denotes the first detector of the layer 1002. Although only two detectors (1002_1, 1002_n) are shown in FIG. 9 for clarity, it is appreciated that the encoder can be coupled to any number of detector nodes that is compatible with the detection apparatus hardware and/or software resources. Furthermore, a single detector node may be coupled to any practical number of encoders.

In one implementation, individual detectors 1002_1, 1002_n may contain logic (which may be implemented as a software code, hardware logic, or a combination of thereof) configured to recognize a predetermined pattern of pulses in the encoded signal 1004. To produce post-synaptic detection signals transmitted over communication channels 1008 various implementations may use, for example, any of the mechanisms described in commonly owned and co-pending U.S. patent application Ser. No. 12/869,573 filed Aug. 26, 2010 and entitled "SYSTEMS AND METHODS FOR INVARIANT PULSE LATENCY CODING", Ser. No. 12/869,583 filed Aug. 26, 2010, entitled "INVARIANT PULSE LATENCY CODING SYSTEMS AND METHODS", Ser. No. 13/117,048 filed May 26, 2011 and entitled "APPARATUS AND METHODS FOR POLYCHRONOUS ENCODING AND MULTIPLEXING IN NEURONAL PROSTHETIC DEVICES", Ser. No. 13/152,084 filed Jun. 2, 2011, entitled "APPARATUS AND METHODS FOR PULSE-CODE INVARIANT OBJECT RECOGNITION", each of which is incorporated herein by reference in its entirety.

In one implementation, the detection signals are delivered to a next layer of the detectors 1012 (comprising detectors 1012_1, 1012_m) for recognition of complex object features and objects, similar to the exemplary configuration described in commonly owned and co-pending U.S. patent application Ser. No. 13/152,084 filed Jun. 2, 2011, entitled "APPARATUS AND METHODS FOR PULSE-CODE INVARIANT OBJECT RECOGNITION", incorporated herein by reference in its entirety. In this configuration, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors and so on, thereby enabling alphabet recognition by the apparatus.

Individual detectors 1002 may output detection (post-synaptic) signals on communication channels 1008 (with appropriate latency) that may propagate with different conduction delays to the detectors 1012. The detector cascade of the apparatus of FIG. 9 may contain any practical number of detector nodes and detector banks determined, inter thrice, by the software/hardware resources of the detection apparatus, and/or complexity of the objects being detected.

The sensory processing apparatus implementation illustrated in FIG. 9 may further comprise lateral connections 1006. In some variants, the connections 1006 are configured to communicate activity indications between neighboring neurons of the same hierarchy level, as illustrated by the connection 1006 in FIG. 9. The neighboring neuron may comprise neurons having overlapping inputs (e.g., the inputs 1004 in FIG. 9), so that the neurons may compete in order to not learn the same input features. In one or more implementations, the neighboring neurons may comprise spatially proximate neurons such as being disposed within a certain volume/area from one another on a 3-dimensional (3D) and/or two-dimensional (2D) space.

The apparatus 1000 may also comprise feedback connections 1014, 1024, configured to communicate context information from detectors within one hierarchy layer to previous layers, as illustrated by the feedback connections 1024 in FIG. 9. In some implementations, the feedback connection 1014 is configured to provide feedback to the encoder 1020, thereby facilitating sensory input encoding, as described in detail in commonly owned and co-pending U.S. patent application Ser. No. 13/152,084 filed Jun. 2, 2011, entitled "APPARATUS AND METHODS FOR PULSE-CODE INVARIANT OBJECT RECOGNITION", incorporated supra.

Output 1020 of the apparatus 1000 may comprise a detection signal (e.g., an indication that a target object has been detected in the input 1010), a processed signal forwarded to another network layer for further processing (e.g., recognition of complex features and/or objects), and/or a signal communicated to another entity (e.g., a motor control block in order to e.g., position a camera).

Various exemplary computerized apparatus configured to execute machine code obtained using multi-threaded parallel network development methodology set forth herein are now described with respect to FIGS. 10A-10D.

Figure 10A:
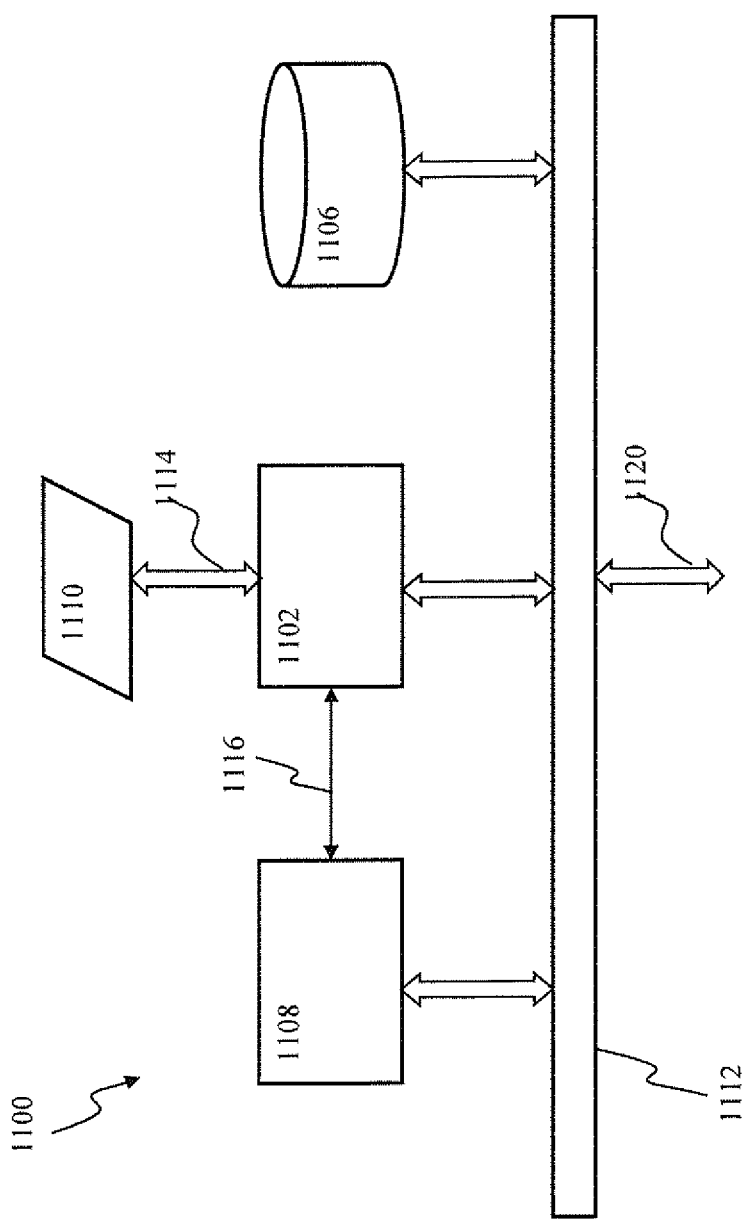
FIG. 10A is a block diagram illustrating a computerized system useful for, inter alia, operating a parallel network using a balanced efficacy methodology, in accordance with one or more implementations.

A computerized neuromorphic processing system, for implementing e.g., an adaptive system of FIG. 8 described, supra, is illustrated in FIG. 10A. The computerized system 1100 of FIG. 10A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from a remote I/O interface.

The system 1100 further may comprise a random access memory (RAM) 1108, configured to store neuronal states and connection parameters and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference, supra In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface 1120 may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processing entities (e.g., computing clusters and/or cloud computing services). Various user input/output interfaces may be similarly applicable to implementations of the invention including, for example, an LCD/LED monitor, touch-screen input and display device, speech input device, stylus, light pen, trackball, and/or other devices.

Figure 10B:
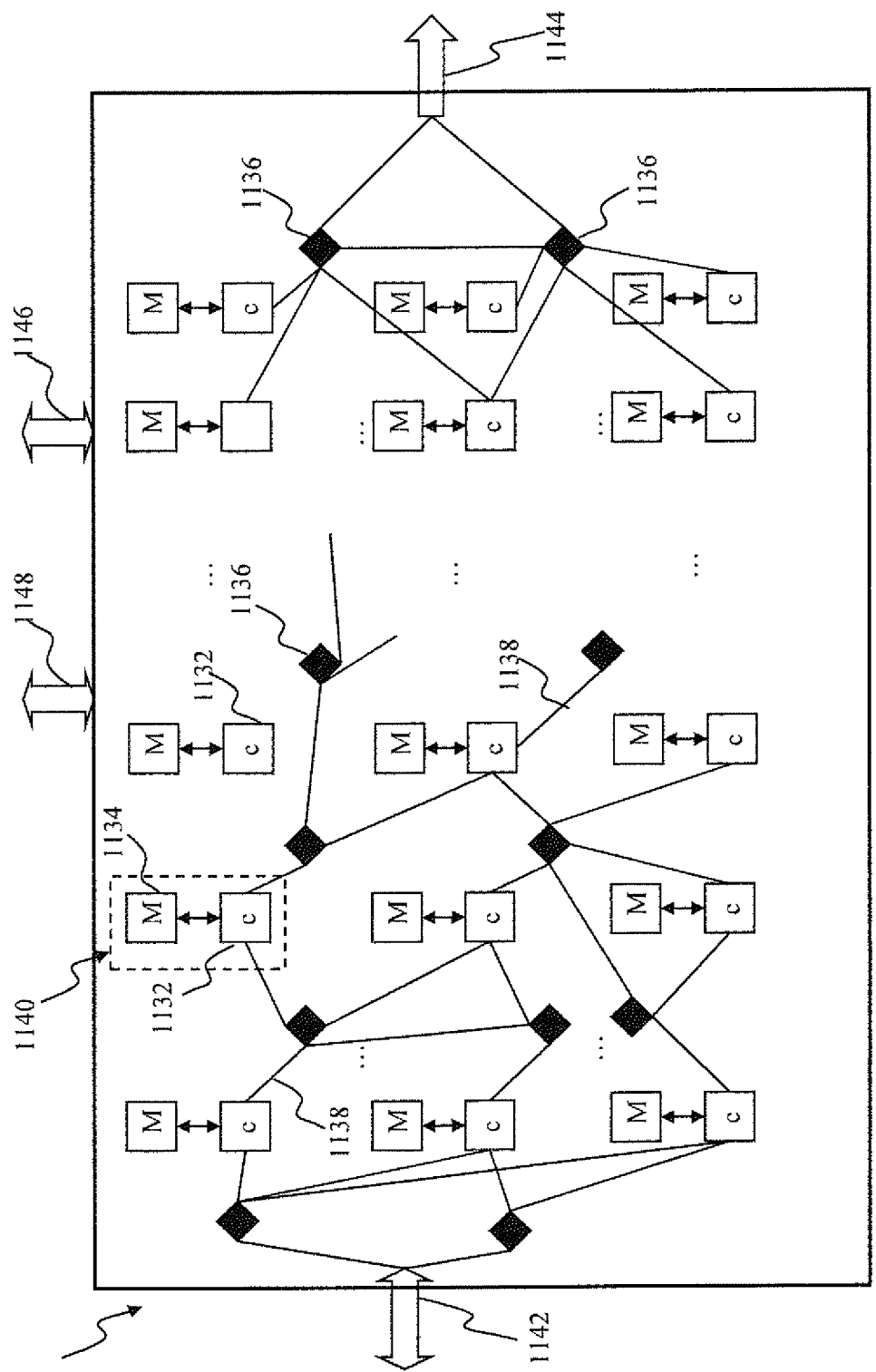
FIG. 10B is a block diagram illustrating a neuromorphic computerized system useful with, inter alia, balanced efficacy methodology of the disclosure, in accordance with one or more implementations.

Referring now to FIG. 10B, one implementation of neuromorphic computerized system configured to implement plasticity modulation mechanism in a spiking network is described in detail. The neuromorphic processing system 1130 of FIG. 10B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 10B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task, as described for example in co-pending and co-owned U.S. patent application Ser. No. 13/487,576 entitled "DYNAMICALLY RECONFIGURABLE STOCHASTIC LEARNING APPARATUS AND METHODS" filed Jun. 4, 2012, incorporated herein by reference in its entirety. External memory may include one or more of a Flash drive, a magnetic drive, and/or other external memory.

Figure 10C:
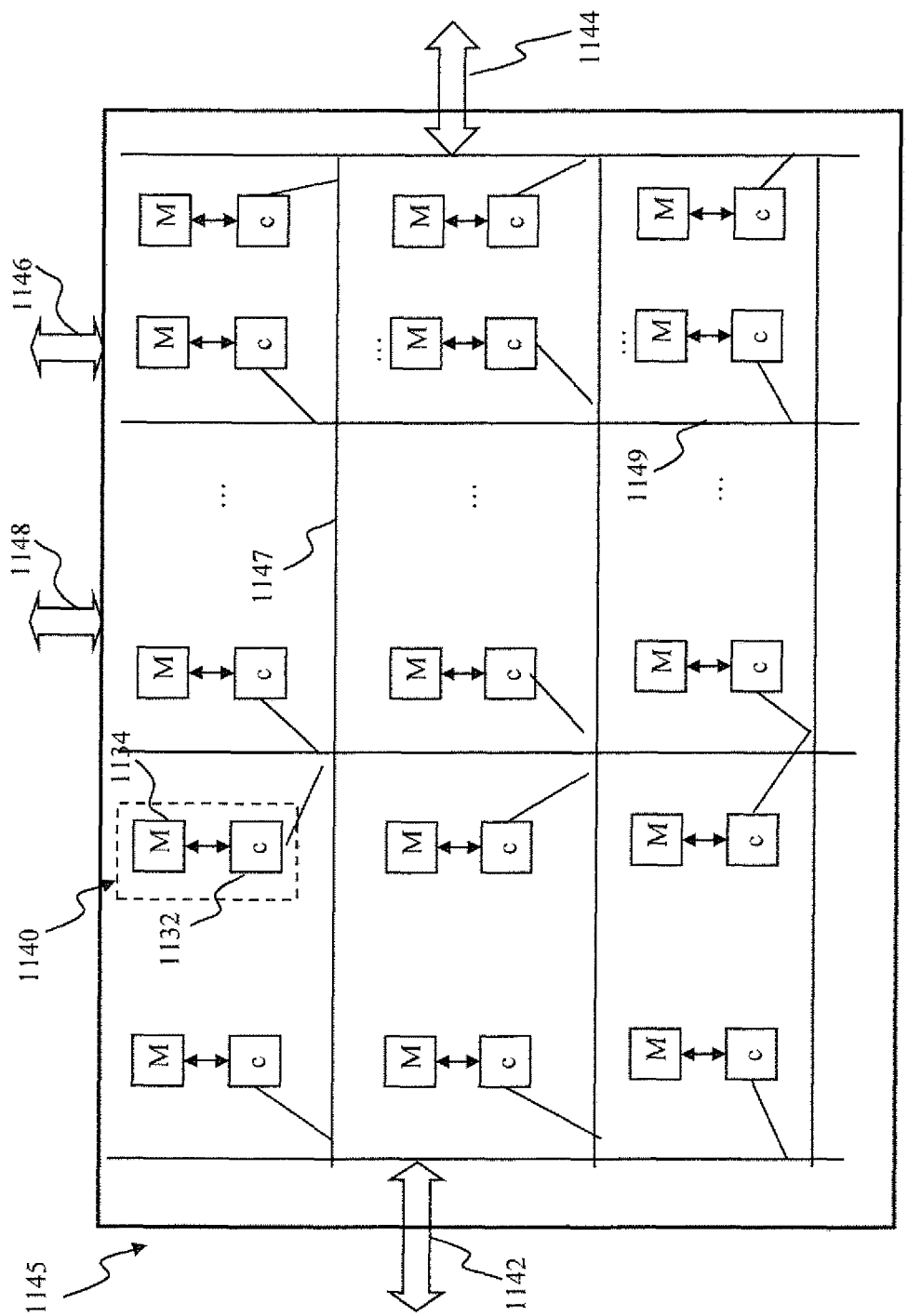
FIG. 10C is a block diagram illustrating a hierarchical neuromorphic computerized system architecture useful with, inter alia, balanced efficacy methodology, in accordance with one or more implementations.

FIG. 10C illustrates one or more implementations of shared bus neuromorphic computerized system 1145 comprising micro-blocks 1140, described with respect to FIG. 10B, supra. The system 1145 of FIG. 10C may utilize shared bus 1147, 1149 to interconnect micro-blocks 1140 with one another.

Figure 10D:
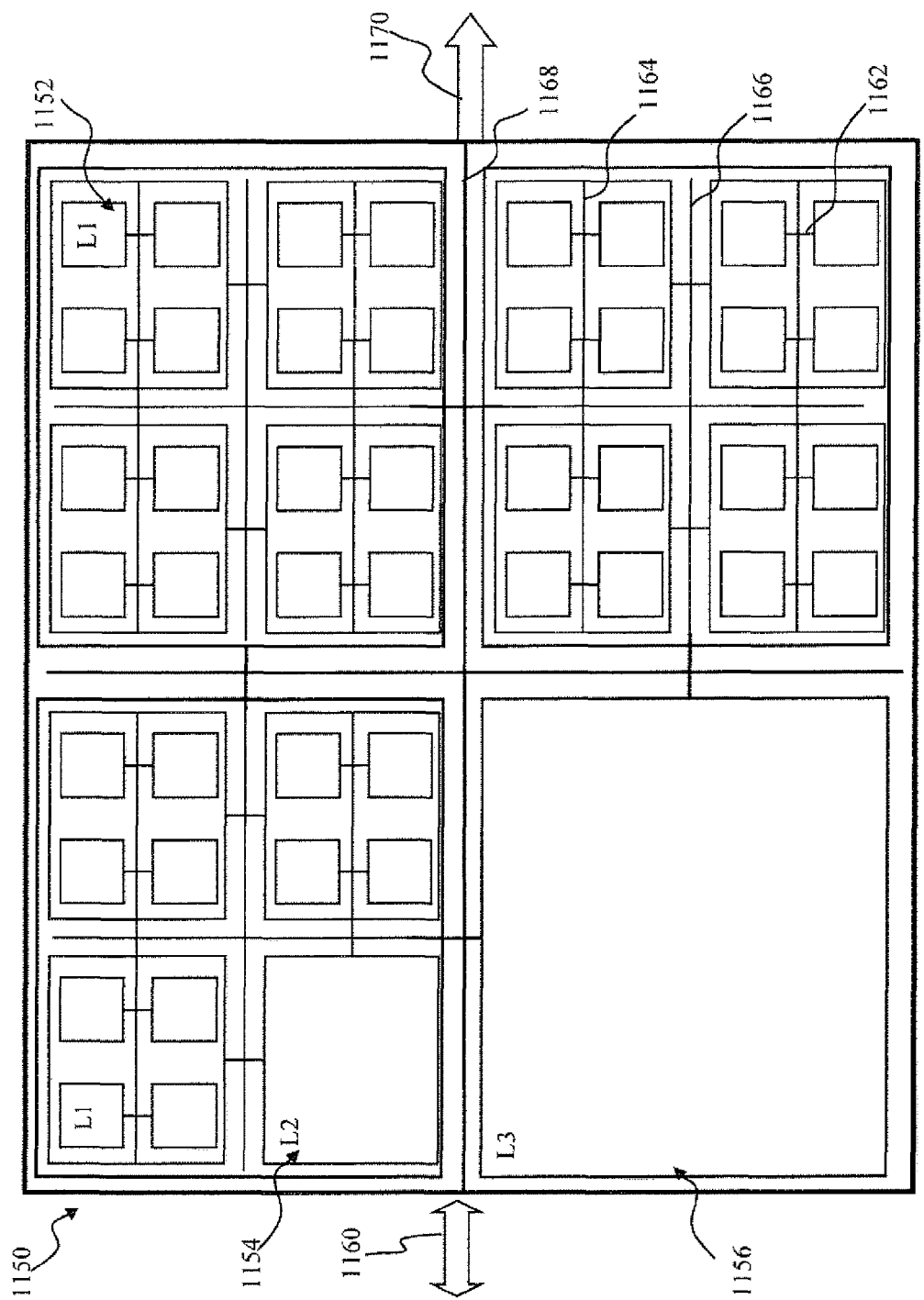
FIG. 10D is a block diagram illustrating cell-type neuromorphic computerized system architecture useful with, inter alia, balanced efficacy methodology, in accordance with one or more implementations.

FIG. 10D illustrates one implementation of cell-based neuromorphic computerized system architecture configured to implement efficacy balancing mechanism in a spiking network. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 10B. A number of cell blocks may be arranged in a cluster and may communicate with one another via local interconnects 1162, 1164. Individual clusters may form higher level cell e.g., cell L2, denoted as 1154 in FIG. 10D. Similarly, several L2 clusters may communicate with one another via a second level interconnect 1166 and form a super-cluster L3, denoted as 1156 in FIG. 10D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating a motor control block for implementing lens motion for tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example in commonly owned and co-pending U.S. patent application Ser. No. 13/487,576, entitled "DYNAMICALLY RECONFIGURABLE STOCHASTIC LEARNING APPARATUS AND METHODS", incorporated, supra.

In one or more implementations, one or more portions of the apparatus 1150 may be configured to operate one or more learning rules, as described for example in commonly owned and co-pending U.S. patent application Ser. No. 13/487,576 entitled "DYNAMICALLY RECONFIGURABLE STOCHASTIC LEARNING APPARATUS AND METHODS" filed Jun. 4, 2012, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

Adaptive plasticity adjustment methodology described herein may enable to achieve efficacy distribution characterized by target statistics in a spiking network. In some implementations, bimodal efficacy distribution may reduce efficacy oscillations and may improve network convergence (e.g., as characterized by a shorter time interval for reaching a target state, and/or reduction in a deviation associated with the target state) without the need for manual weight adjustments that may be employed by networks of the prior art.

The principles described herein may also be combined with other mechanisms of data encoding in neural networks, such as those described in commonly owned and co-pending U.S. patent application Ser. No. 13/152,084 entitled APPARATUS AND METHODS FOR PULSE-CODE INVARIANT OBJECT RECOGNITION" filed Jun. 2, 2011, and Ser. No. 13/152,119, Jun. 2, 2011, entitled "SENSORY INPUT PROCESSING APPARATUS AND METHODS", and Ser. No. 13/152,105 filed on Jun. 2, 2011, and entitled "APPARATUS AND METHODS FOR TEMPORALLY PROXIMATE OBJECT RECOGNITION", incorporated, supra.

Advantageously, exemplary implementations of the present innovation may be useful in a variety of applications including, without limitation, video prosthetics, autonomous and robotic apparatus, and other electromechanical devices requiring video processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

The balanced efficacy approach may be useful for neural networks configured for video data processing (e.g., compression) in a wide variety of stationary and portable video devices, such as, for example, smart phones, portable communication devices, notebook, netbook and tablet computers, surveillance camera systems, and practically any other computerized device configured to process vision data.

Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, various of the teachings of the disclosure may be applied to motion estimation, wherein an image sequence may be processed to produce an estimate of the object position and velocity (either at each point in the image or in a 3D scene, or even within a camera that captures one or more images). Examples of such tasks include egomotion e.g., determining the three-dimensional rigid motion (rotation and translation) of the camera from an image sequence produced by the camera, and following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An apparatus configured for sensory input processing within a spiking neuron network, comprising:
   a first plurality of nodes configured to generate a spiking signal based at least on the sensory input;
   a second plurality of nodes configured to generate one or more output spikes based at least on receipt of the spiking signal via a plurality of connections; and
   a logic module configured to evaluate an efficacy of the plurality of connections, and to modulate an adjustment of the efficacy of the plurality of connections based at least on the efficacy evaluation;
   wherein:
   the efficacy of individual ones of the plurality of connections comprises a weight applied to a process of a given neuron based on a receipt of the one or more output spikes; and
   the efficacy evaluation comprises a determination of a percentile rank of values of the weight for the plurality of connections over a time interval prior to the adjustment modulation.

2. The apparatus of claim 1, wherein:
   the efficacy evaluation further comprises a determination of a statistical parameter associated with the efficacy of the plurality of connections; and
   the adjustment of the efficacy of the plurality of connections comprises a connection potentiation or a connection depression, the connection potentiation or connection depression being configured based at least on a time interval between an output spike of the one or more output spikes and a spike of the spiking signal for a given neuron of the second plurality of nodes.

3. The apparatus of claim 1, wherein:
   the sensory input is characterized by a refresh rate of 25 Hz;
   the time interval is selected from a range between 40 ms and 4000 ms inclusive; and
   a threshold is approximately 0.5 for weights of individual ones of the plurality of connections between zero (0) and one (1) inclusive.

4. The apparatus of claim 2, wherein the logic module is configured such that:
   when the determination of the statistical parameter indicates that the parameter is no greater than a threshold, an efficacy adjustment magnitude for a subsequent efficacy modification is increased; and
   when the determination indicates that the parameter is greater than the threshold, the efficacy adjustment magnitude for the subsequent efficacy modification is decreased.

5. The apparatus of claim 4, wherein:
   the logic module is configured such that:
   when the spike precedes the output spike, the connection is potentiated;
   when the spike precedes the output spike, the connection is depressed, the depression of the connection configured to delay a response by a given node subsequent to the output spike; and
   the potentiation of the connection is configured to occur prior to the response.

6. The apparatus of claim 5, wherein:
   the connection potentiation comprises an increase of the weight;
   the connection depression comprises a decrease of the weight; and
   a magnitude of the increase or decrease of the weight is configured based at least on the efficacy adjustment magnitude.

7. The apparatus of claim 6, wherein the logic module is configured such that the modulation of the adjustment of the efficacy of the plurality of connections:
   increases the adjustment magnitude based on the statistical parameter being less than the threshold; and
   decreases the adjustment magnitude based on the statistical parameter being greater than the threshold.

8. The apparatus of claim 5, wherein:
   the efficacy of individual ones of the plurality of connections comprises a delay applied to a process of the given neuron based at least on receipt of the spike;
   the connection potentiation comprises a decrease of the delay;
   the connection depression comprises an increase of the delay; and
   a magnitude of the increase or the decrease of the delay is related at least in part to the efficacy adjustment magnitude.

9. The apparatus of claim 5, wherein:
   the potentiation of the connection is characterized by a potentiation interval configured so that the efficacy of the connection configured to provide the spike to the given neuron within the potentiation interval prior to the output spike is increased; and
   the efficacy of the connection configured to provide the spike to the neuron outside the potentiation interval prior to the response is maintained at a value of the efficacy prior to the output spike.

10. The apparatus of claim 5, wherein:
the depression of the connection decreases a probability associated with the output spike generation at the given node; and
the potentiation of the connection increases a probability associated with the output spike generation at the given node.

11. A method of managing a plurality of connections operable in accordance with a plasticity rule in a spiking neuron network, the method comprising:
determining a statistical parameter associated with an efficacy of the plurality of connections based at least on the plasticity rule, the plasticity rule being characterized by a connection potentiation portion having a potentiation time interval associated therewith;
evaluating the statistical parameter based at least on a target efficacy; and
modifying the plasticity rule based at least on the evaluation, the modifying comprising:
when a comparison indicates that the statistical parameter is no greater than the target efficacy, increasing the potentiation time interval associated with the plasticity rule; and
when the comparison indicates that the statistical parameter is greater than the target efficacy, decreasing the potentiation time interval associated with the plasticity rule.

12. The method of claim 11, wherein:
the plasticity rule is characterized by a connection depression portion having a depression magnitude associated therewith; and
the modifying the plasticity rule further comprises:
when the comparison indicates that the statistical parameter is no greater than the target efficacy, decreasing the depression magnitude associated with the plasticity rule; and
when the comparison indicates that the statistical parameter is greater than the target efficacy, increasing the depression magnitude associated with the plasticity rule.

13. The method of claim 12, wherein:
the plasticity rule is further characterized by the connection potentiation portion having a potentiation magnitude associated therewith; and
the modifying the plasticity rule further comprises:
when the comparison indicates that the statistical parameter is no greater than the target efficacy, increasing the potentiation magnitude associated with the plasticity rule; and
when the comparison indicates that the statistical parameter is greater than the target efficacy, decreasing the potentiation magnitude associated with the plasticity rule.

14. A non-transitory computer-readable storage apparatus having instructions embodied thereon, the instructions configured to, when executed, implement logic configured to modify at least one plasticity rule in an artificial spiking neuron network by at least:
modification of an efficacy of a plurality of connections between neurons of the network;
determination of a statistical parameter associated with the modified efficacy;
increase, when the determination indicates that the statistical parameter is no greater than a threshold, of an efficacy adjustment magnitude for a subsequent efficacy modification; and
decrease, when the determination indicates that the statistical parameter is greater than the threshold, of the efficacy adjustment magnitude for the subsequent efficacy modification;
wherein:
the modification of the efficacy of individual ones of the plurality of connections comprises one of (i) an increase or (ii) a decrease in the efficacy;
an extent of the increase or decrease is configured based at least on the efficacy adjustment magnitude; and
the determination of the statistical parameter comprises a determination of at least one of (i) a mean or (ii) a median efficacy of the plurality of the connections.

15. The non-transitory computer-readable storage apparatus of claim 14, wherein the modification of the efficacy of the plurality of connections comprises a connection potentiation or a connection depression.

16. The non-transitory computer-readable storage apparatus of claim 15, wherein:
the efficacy of the individual ones of the plurality of connections comprises a delay applied to a process of a given neuron based at least on a receipt of a spike;
the connection potentiation comprises a decrease of the delay;
the connection depression comprises an increase of the delay; and
a magnitude of the increase or the decrease of the delay is related at least in part to the efficacy adjustment magnitude.

17. The non-transitory computer-readable storage apparatus of claim 15, wherein:
when the determination of the statistical parameter indicates that the parameter is no greater than a threshold, an efficacy adjustment magnitude for a subsequent efficacy modification is increased; and
when the determination indicates that the parameter is greater than the threshold, the efficacy adjustment magnitude for the subsequent efficacy modification is decreased.

18. The non-transitory computer-readable storage apparatus of claim 17, wherein the logic is further configured to:
increase the efficacy adjustment magnitude based on the statistical parameter being less than the threshold; and
decrease the efficacy adjustment magnitude based on the statistical parameter being greater than the threshold.

* * * * *